United States Patent [19]
Taghezout

[11] Patent Number: 5,917,257
[45] Date of Patent: Jun. 29, 1999

[54] ELECTROMAGNETIC MOTOR WITH TWO COAXIAL ROTORS

[75] Inventor: Daho Taghezout, Morges, Switzerland

[73] Assignee: Eta SA Fabriques d'Ebauches, Grenchen, Switzerland

[21] Appl. No.: 08/975,117

[22] Filed: Nov. 20, 1997

[30] Foreign Application Priority Data

Nov. 27, 1996 [CH] Switzerland ............... 2919/96

[51] Int. Cl.[6] ................... H02K 21/14; H02K 37/14
[52] U.S. Cl. ................... 310/49 R; 310/40 MM; 310/156
[58] Field of Search ................... 310/49 R, 156, 310/114, 40 MM

[56] References Cited

U.S. PATENT DOCUMENTS

| | | | |
|---|---|---|---|
| 4,031,419 | 6/1977 | Spiesberger et al. | 310/49 R |
| 4,455,499 | 6/1984 | Sudler | 310/49 R |
| 4,642,494 | 2/1987 | Lundin et al. | 310/49 R |
| 4,733,114 | 3/1988 | Suyama et al. | 310/49 R |
| 5,124,599 | 6/1992 | Chan et al. | 310/49 R |

FOREIGN PATENT DOCUMENTS

| | | |
|---|---|---|
| 0 312 946 | 4/1989 | European Pat. Off. . |
| 0 746 084 | 12/1996 | European Pat. Off. . |
| 50 77811 | 6/1975 | Japan . |

OTHER PUBLICATIONS

Patent Abstracts of Japan vol. 16, No. 482 (E–1275), Oct. 7, 1992 & JP 04 172974 A (Seiko Epson), Jun. 19, 1992.

*Primary Examiner*—Nestor Ramirez
*Assistant Examiner*—Burton S. Mullins
*Attorney, Agent, or Firm*—Griffin, Butler Whisenhunt & Szipl, LLP

[57] ABSTRACT

The motor (1) includes three stator parts (11, 12, 13) and two coaxial rotors (2, 3) each including a multipolar magnet having axial magnetization (4, 5) arranged between the third (13) and the first (11) respectively the second stator poles (12). The latter each comprises two stator poles (15, 16, 22, 23) having a plurality of teeth (19, 20, 26, 27) staggered with respect to one another. In the rest positions of the rotors (2, 3) the magnetic dipoles (6) of their magnets (4, 5) are phase-shifted with respect to the respective teeth (19, 20, 26, 27). Two coils (51, 52) are each coupled to a stator pole (15, 22), a third coil (53) is coupled to the other two stator poles (16, 23).

As result of this arrangement, the motor (1) is compact and its rotors (2, 3) are able to rotate in both directions independently of each other.

10 Claims, 13 Drawing Sheets

ELECTROMAGNETIC MOTOR WITH TWO COAXIAL ROTORS

The present invention concerns an electromagnetic motor including two coaxial rotors capable of rotating independently of each other in either of the two possible directions of rotation, and which are intended, in particular, to drive directly, i.e. without the interposition of a gear train, two mobile mechanical elements, also coaxial, such as two hands of a timepiece or a counter.

Numerous timepieces including at least one pair of coaxial hands intended to move independently of each other exist. Among these timepieces, one can cite by way of example chronograph watches in which the hand intended to display the seconds of the measured time has the same axis of rotation, situated at the centre of the dial, as the hands for the display of the hour and the minute of the present time. Timepieces in which the coaxial hands intended normally to display the hour and minute of the present time may also move independently of each other to display another piece of information such as the date, an alarm time or a measured time may also be mentioned.

In the timepieces of this type, the independent movement of two coaxial hands is generally assured by two distinct motors each connected to one of the hands by a gear train.

Moreover, so-called multi-polar motors are known whose rotor rotates by steps of several degrees whereas the rotor of conventional bipolar motors rotates by steps of 180°. In a timepiece, such a motor has the advantage that the hand which it has to drive may be mounted directly onto the shaft of its rotor. The gear train which must be used to connect a bipolar motor to the hand which it drives is thus no longer necessary, which simplifies the design of the timepiece and reduces its cost price.

European Patent EP-A-0 312 946 discloses a unit formed of two superposed multi-polar motors. The shaft of the rotor of one of the motors is hollow and allows the passage of the shaft of the other motor, so that two hands may be fixed directly onto these shafts and be driven independently of each other.

The thickness of this unit is quite significant, all the more since a non-negligible space has to be provided between the two motors to avoid one having any magnetic effect on the other. This motor unit thus has the drawback, when it is used in a timepiece, of requiring the latter to have a significant thickness, which is not generally desired.

An object of the present invention is thus to propose a motor which is also intended to drive directly two coaxial mechanical elements such as the hands of a timepiece independently of each other, but having a markedly smaller thickness than that of the two motor unit disclosed in the aforementioned document, which allows it to be used in a timepiece without requiring the thickness of the latter to be too significant.

Japanese Patent Application JP-A-50 77811 discloses a motor including a plurality of rotors which may be actuated independently of each other. But these rotors are not coaxial. On the other hand, signals of different shapes must be applied to this motor to actuate separately each of its rotors. Elaboration of these different shaped signals complicates the production, and thus increases the price, of the electronic control circuit of this motor. Furthermore, the shape of these signals makes the motor's operation unreliable and gives the latter low energy efficiency.

Another object of the present invention is thus to propose a motor including two rotors able to be controlled independently of each other in a very reliable manner in response to signals having the shape of pulses which may be produced by a simple inexpensive electronic circuit, and which allow the motor to have high energy efficiency.

These objects are achieved by the features of the electromagnetic motor defined in the claims annexed to the present description.

As a result of the features of the motor of claim 1, the space requirement of this motor is smaller than that of the two motor unit disclosed in the aforementioned European Patent EP-A-0 312 946. In particular, the presence of the third stator part between the first and second stator parts assures perfect magnetic decoupling of these two parts. A space such as that which separates the two motors of the unit disclosed in European Patent EP-A-0 312 946 is thus not necessary in the motor according to the present invention the thickness of which may thus be markedly smaller than that of said two motor unit.

Moreover, and again as a result of the features enumerated hereinbefore, the motor according to the present invention may be controlled by pulses of simple shape, similar to the well known shape of pulses used to control conventional bipolar stepping motors. Consequently, with respect to the motor disclosed in Japanese Patent JP-A-50 77811, the motor according to the present invention may be controlled by a simpler, and thus more economical electronic circuit, the operation thereof is more reliable and its energy efficiency is higher.

The man skilled in the art will also easily see that the third stator part also assures a shielding function for the motor according to the present invention against external magnetic fields, which further increases the reliability of this motor.

Other features and advantages of the present invention will appear in the description which follows and which will be made, by way of non-limiting example, with the aid of the annexed drawing in which FIG. 1 is an overall view of a motor according to the present invention;

FIGS. 1 to 8 show schematically an embodiment of the motor according to the invention generally designated by the reference 1.

Figure 1:
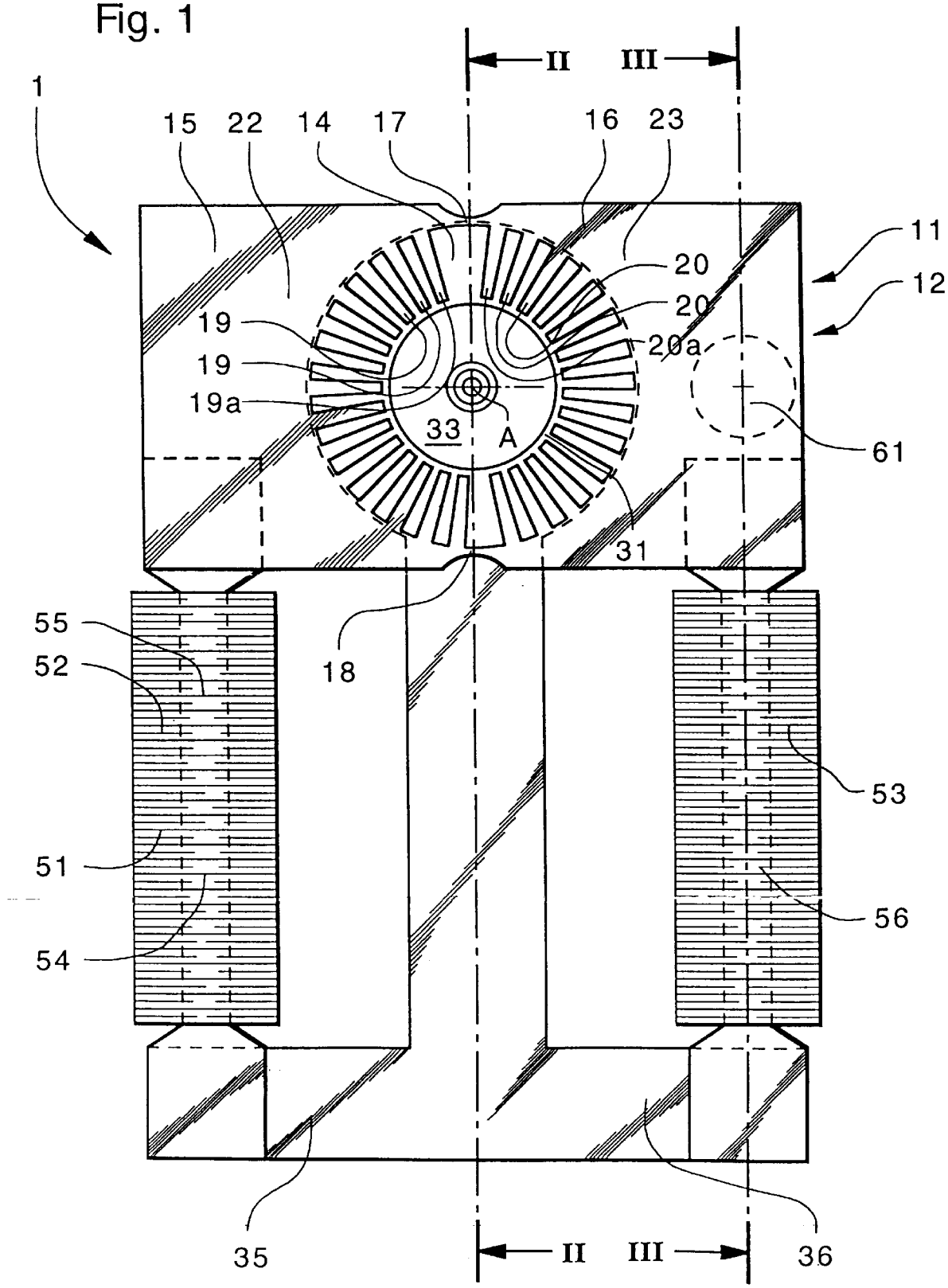

Motor 1 includes two rotors 2 and, respectively 3 arranged so as to be able to rotate independently of each other about a common axis of rotation A. These rotors 2 and 3 have not been shown in FIG. 1 to avoid complicating the Figure unnecessarily.

Rotors 2 and 3 each include a permanent magnet 4, respectively 5, in the shape of a disc centred on axis of rotation A and including a plurality of magnetic dipoles 6 arranged in a regular manner on its periphery. Magnetic dipoles 6 all have a magnetisation axis parallel to axis of rotation A, and the direction of magnetisation of each of them is opposite to the direction of magnetisation of the two magnetic dipoles 6 which are adjacent thereto. In other words, magnets 4 and 5 are multipolar permanent magnets having axial magnetisation.

In the description hereinafter, the numbers of magnetic dipoles 6 which include magnets 4 and 5 will be designated $N_1$ and $N_2$. Likewise, the radius passing through the middle of a magnetic dipole 6 will be called its geometric axis. Moreover the angles at centre formed respectively by the geometric axes of two magnetic dipoles 6 adjacent to magnet 4, and by the geometric axes of two magnetic dipoles 6 adjacent to magnet 5 will be designated $\alpha_1$ and $\alpha_2$. These angles $\alpha_1$ and $\alpha_2$ are obviously respectively equal to $360°/N_1$ and $360°/N_2$.

Rotors 2 and 3 each include a shaft 7, 8 respectively, having an identical axis to axis of rotation A and one end of which is attached to magnet 4, 5 respectively.

Shaft 7 of rotor 2 is hollow, and it is arranged around a guide pipe 9 which also has an identical axis to axis of rotation A. Shaft 7 is arranged around guide pipe 9 so as to be able to rotate freely about axis of rotation A but to be blocked in translation with respect to the latter.

Shaft 8 of rotor 3 is arranged within guide pipe 9, also so as to be free to rotate about axis A but blocked in translation with respect to the latter.

Guide pipe 9 is blocked in rotation and in translation in a way which will be described hereinafter.

Figure 2:
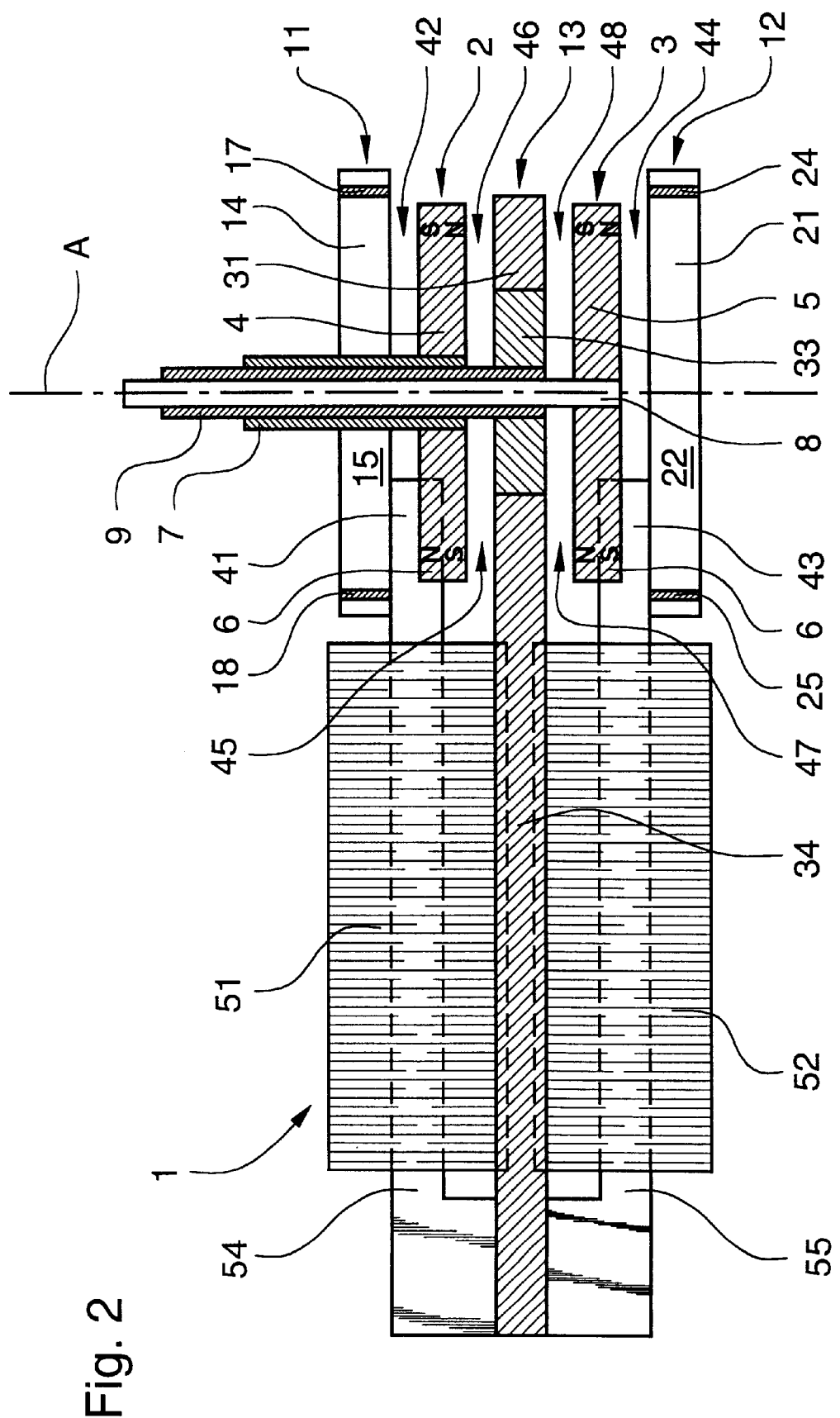
FIGS. 2 and 3 are cross-sections of the motor of FIG. 1 made respectively along axes II—II and III—III of the latter.

The means which prevent any translation of shafts 7 and 8 with respect to axis A while allowing them to rotate with respect to the latter are well known to persons skilled in the art and have not been shown in FIG. 2 to avoid overloading the drawing unnecessarily. Likewise, the means for fixing magnets 4 and 5 to shafts 7 and 9 respectively have not been shown in FIG. 2, where rotors 2 and 3 are represented only by magnets 4 and 5 and shafts 7 and 8.

In the present example where magnets 4 and 5 have the shape of discs, and for a reason which will become obvious in the description hereinafter, shafts 7 and 8 and guide pipe 9 are made of a non-magnetic material such as, for example, brass.

In another embodiment of motor 1, not shown, magnets 4 and/or 5 have the shape of rings centred on axis of rotation A and fixed onto a disc. If this latter disc is made of a non-magnetic material such as brass, shafts 7 and 8 and guide pipe 9 may be made of a magnetic material such as steel.

The two coaxial mechanical elements, not shown, which have to be driven by motor 1 may be respectively fixed to the free end of shaft 7, which preferably protrudes from guide pipe 9, and to the free end of shaft 8. The means for fixing these mechanical elements to these shafts 7 and 8 have not been shown because they may be of a very varied nature and are in any case well known to persons skilled in the art.

Motor 1 also includes a first and a second stator part designated respectively by the references 11 and 12. These stator parts 11 and 12 are arranged on either side of a third stator part 13.

The three stator parts 11, 12 and 13 are made of a material having high magnetic permeability such as one of the well known materials commonly used to make the stator of stepping motors which drive the hands of a large number of the currently manufactured timepieces.

In the present example, stator parts 11, 12 and 13 are planar, parallel to each other and perpendicular to axis of rotation A.

Moreover, permanent magnets 4 and 5 of rotors 2 and 3 are situated on either side of stator part 13 and between the latter and, respectively, stator parts 11 and 12.

Stator part 11 has an opening 14 circumscribed by a circle centred on axis of rotation A and having approximately the same diameter as magnet 4 of rotor 2.

This opening 14 separates stator part 11 into two portions. It will be seen hereinafter that these two portions constitute stator poles which will be designated by the references 15 and 16.

The shape and the dimensions of stator part 11 are selected so that stator poles 15 and 16 are connected only by zones, or necks, 17 and 18 having a sufficiently small cross-section that their magnetic reluctance is very high.

Stator poles 15 and 16 each include a plurality of teeth, designated respectively by the references 19 and 20, which extend in a radial direction from the edge of opening 14 towards axis of rotation A. These teeth 19 and 20 are separated from each other by spaces, and their exact arrangement will be described hereinafter. It will simply be mentioned here that tooth 19 and tooth 20 which are the closest to neck 17 are respectively designated 19a and 20a.

Figure 8:
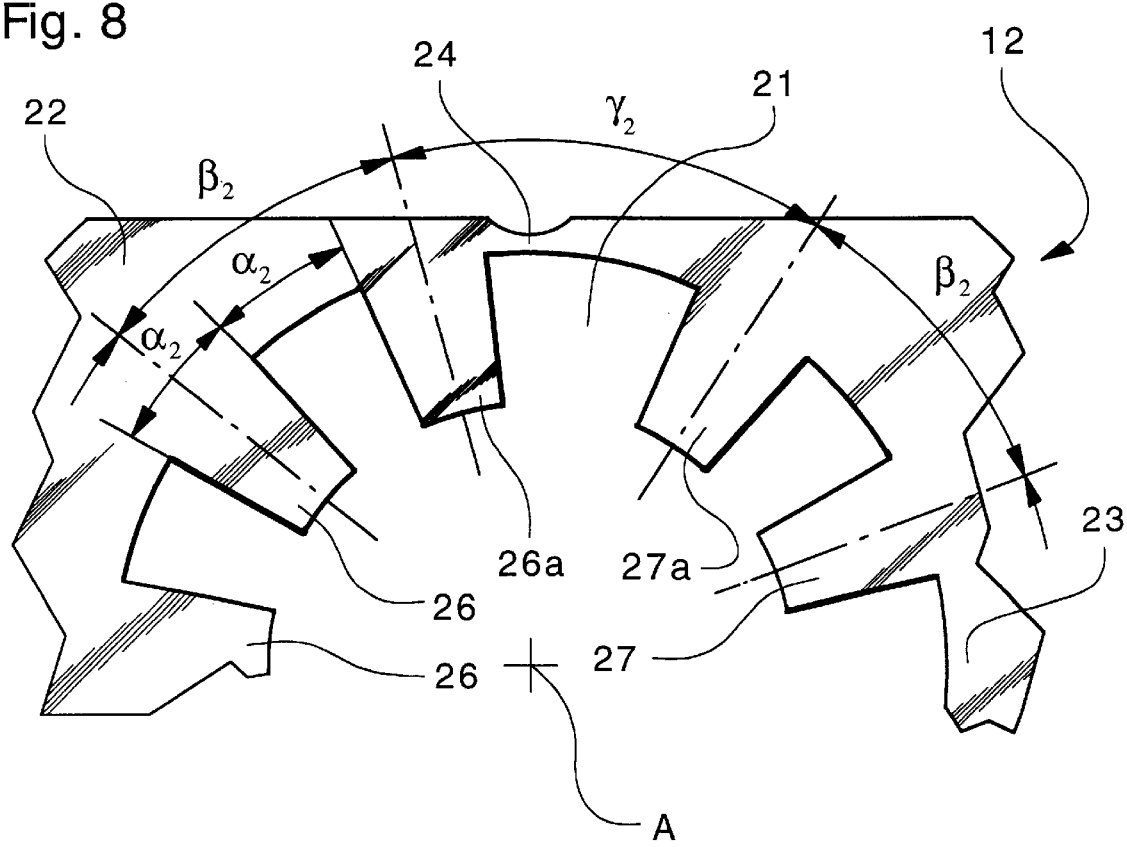

Stator part 12 which is not visible in FIG. 1 but which is partially shown in FIGS. 2 and 8, also has an opening designated by the reference 21. This opening 21 is also circumscribed by a circle centred on axis of rotation A and having approximately the same diameter as the magnet of rotor 3. Opening 21 separates stator 12 into two portions. It will be seen hereinafter that these two portions also constitute stator poles which will be designated by the references 22 and 23. The shape and the dimensions of stator part 12 are selected so that stator poles 22 and 23 are connected only by necks 24 and 25 having a sufficiently small cross-section that their magnetic reluctance is also very high.

Stator poles 22 and 23 also each include a plurality of teeth, designated respectively by the references 26 and 27, which extend in a radial direction from the edge of opening 21 towards axis of rotation A and which are also separated by spaces. The exact arrangement of teeth 26 and 27 will also be described hereinafter. It will simply be mentioned here that the tooth 26 and the tooth 27 which are the closest to neck 24 are respectively designated 26a and 27a.

It should be noted that teeth 19 and 26 have not been shown in FIG. 2 to avoid overloading the latter unnecessarily.

Figure 6:
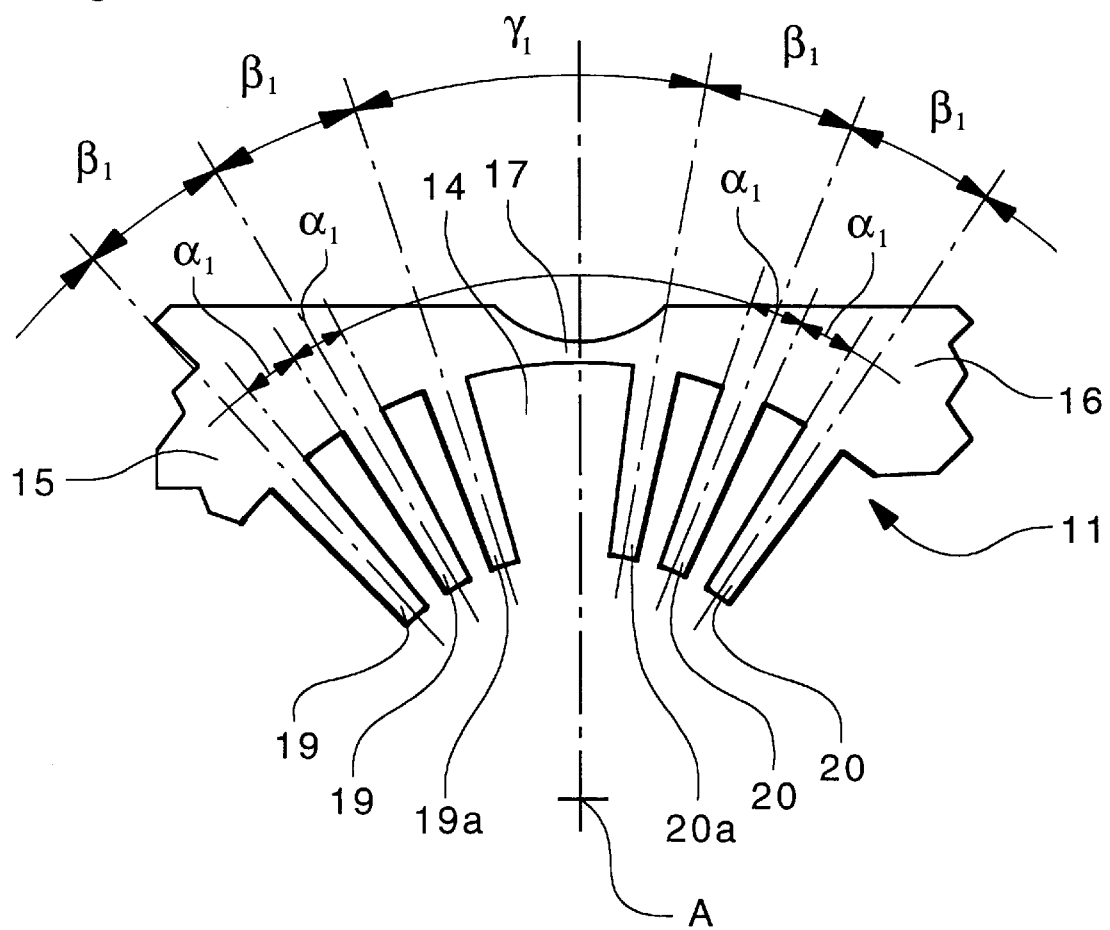

For a reason which will become obvious hereinafter, the angles at centre formed by the axes of two adjacent teeth 19 and by the axes of two adjacent teeth 20, which are designated by $\beta_1$ in FIG. 6, are equal to each other and to twice angle $\alpha_1$ defined hereinbefore.

Moreover, in this example the angle at centre formed by the flanks of a tooth 19, or of a tooth 20, is substantially equal to the angle at centre formed by the flanks of two adjacent teeth 19, or 20, which delimit the space separating these two teeth. These angles are thus both substantially equal to angle $\alpha_1$.

Conversely, the angle at centre formed by the axes of teeth 19a and 20a, which is designated $\gamma_1$ in FIG. 6, is not an integral multiple of angle $\alpha_1$ or of angle $\beta_1$ but it is equal to $(k_1 \cdot \beta_1 + \beta_1/3)$ where $k_1$ is an integral number.

Since teeth 19 and, respectively, 20 are arranged in a regular manner around opening 14 as has been described hereinbefore and they thus have what may be called angular periodicity, it will be said in the description which follows that, in the negative trigonometric direction, teeth 20 are out of phase or phase-shifted with respect to teeth 19 by an angle of $\beta_1/3$, i.e. $2\alpha_1/3$. This angle will be called the phase-shift or phase difference angle of teeth 20 with respect to teeth 19.

Likewise, the angles at centre formed by the axes of two adjacent teeth 26 or by the axes of two adjacent teeth 27, which are designated $\beta_2$ in FIG. 8, are equal to each other and to twice angle $\alpha_2$ defined hereinbefore.

Moreover, again in this example, the angle at centre formed by the flanks of a tooth 26, or of a tooth 27, is substantially equal to the angle at centre formed by the flanks of two adjacent teeth 26, 27, which define the space separating these two teeth. These angles are thus all substantially equal to angle $\alpha_2$.

Conversely, the angle at centre formed by the axes of teeth 26a and 27a, which is designated $\gamma_1$ in FIG. 8, is also not an integral multiple of angles $\alpha_2$ or $\beta_2$, but it is equal to $(k_2 \cdot \beta_2 + \beta_2/3)$ where $k_2$ is an integral number. For similar reasons to those which have been given hereinbefore in connection with teeth 19 and 20, it will be said in the following description that, in the negative trigonometric direction, teeth 27 are out of phase with respect to teeth 26 by an angle equal to $\beta_2/3$ i.e. $+2\alpha_2/3$. This angle will be called the phase-shift angle of teeth 27 with respect to teeth 26.

It will be seen hereinafter that rotors 2 and 3 of motor 1 rotate by successive steps, and that the number of steps effected by each of these rotors 2 and 3 to rotate through one complete revolution, i.e. of 360°, is equal to the number $N_1$, $N_2$ respectively, of magnetic dipoles 6 included in their permanent magnet 4, 5 respectively. The angles travelled through by rotors 2 and 3 at each of their steps are thus respectively angles $\alpha_1$ and $\alpha_2$ defined hereinbefore.

Thus, for example, if the mechanical element fixed to shaft 7 of rotor 2 is the second hand of a timepiece and this rotor 2 must therefore rotate 60 steps per revolution, magnet 4 must include 60 magnetic dipoles 6. Angles $\alpha_1$ and $\beta_1$ thus have respective values of 6° and 12°.

Moreover, the phase-shift angle of teeth 20 with respect to teeth 19, as it has been defined hereinbefore is equal to 12°/3, i.e. 4°.

Again in this example, if number $k_1$ had been selected to be equal to 2, angle $\gamma_1$ defined hereinbefore would be equal to (2.12°+12°/3), i.e. 28°.

Figure 5:
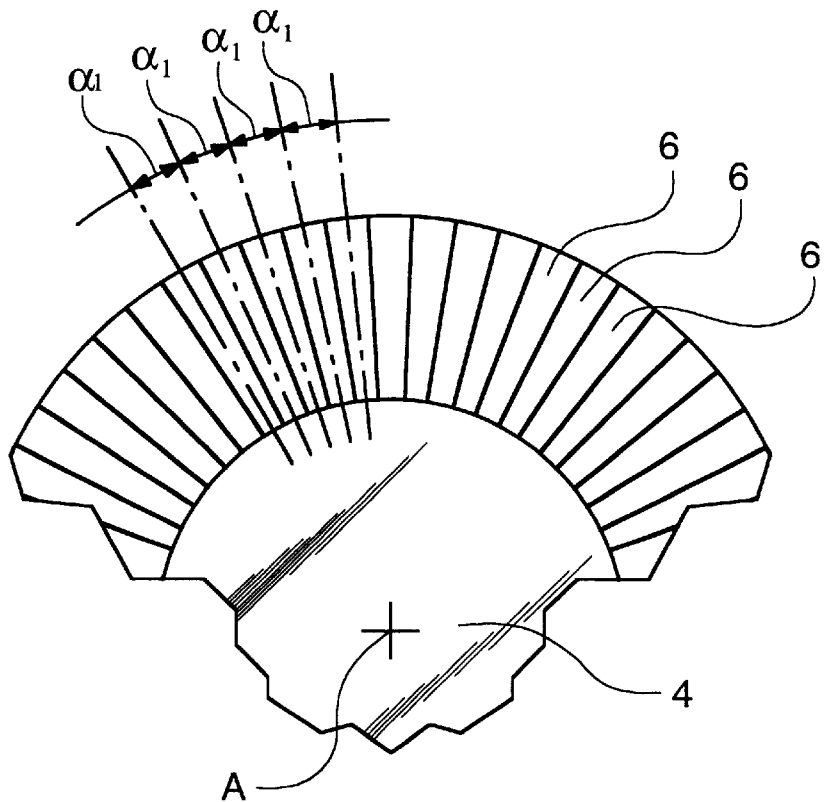
FIGS. 5 to 8 show in detail portions of certain components of the motor of FIG. 1.

Such an example is shown in FIG. 1 and in more detail in FIGS. 5 and 6.

Again by way of example, if rotor 3 must rotate through 20 steps per revolution, its magnet 5 must include 20 magnetic dipoles 6. Angles $\alpha_2$ and $\beta_2$ thus respectively have values of 18° and 36°, and the phase-shift angle of teeth 27 with respect to teeth 26, is equal to 36°/3, i.e. 12°.

If number $k_2$ is equal to 1, angle $\gamma_2$ is equal to (36°+12°), i.e. 48°.

Figure 7:
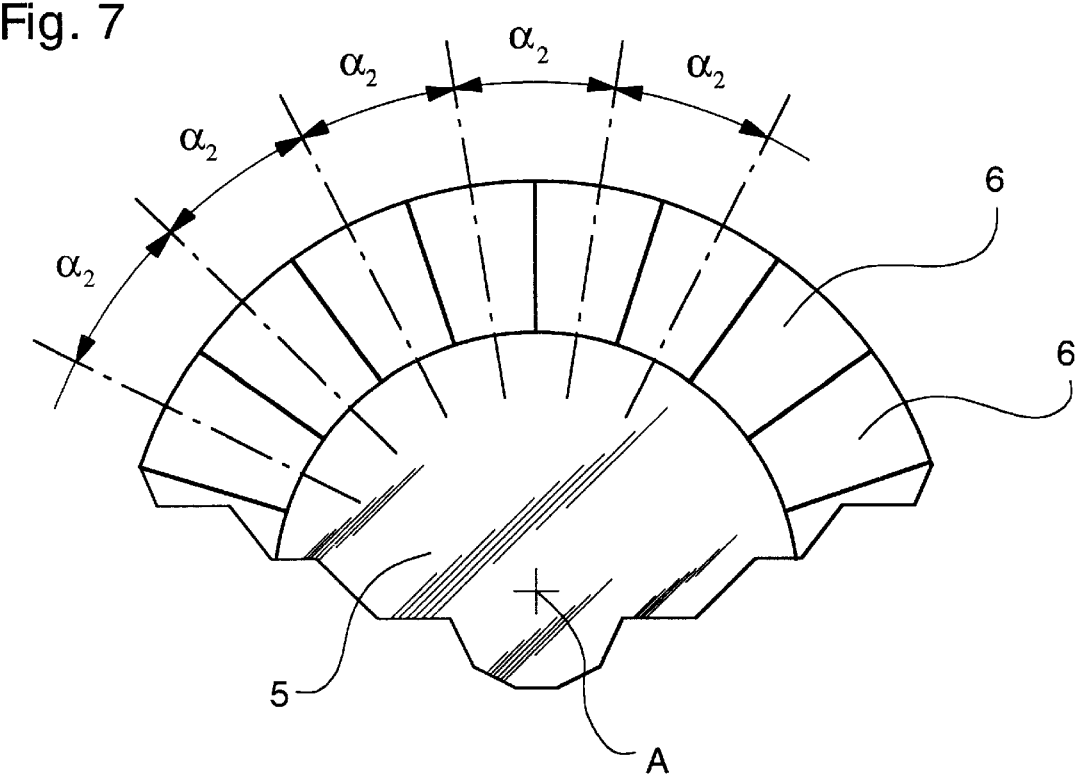

Such an example is shown in detail in FIGS. 7 and 8.

It should be noted that the present invention is obviously not limited to the examples which have just been described, but that numbers $N_1$ and $N_2$ of magnetic dipoles 6 included respectively in magnets 4 and 5 may be any number, on condition only that they are even numbers. In particular, these numbers $N_1$ and $N_2$ may be equal.

In this example, stator part 13 includes an annular portion, which, it will be seen hereinafter, constitutes a stator pole which will be designated by the reference 31.

The two circles which delimit stator pole 31 are centred on axis of rotation A, and their diameters are also chosen so that stator pole 31 is situated facing teeth 19, 20, 26 and 27 forming part respectively of stator poles 15, 16, 22 and 23.

The central opening of stator pole 31, designated by the reference 32, is occupied by an end plate 33 in the shape of a disc, which is preferably made of a nonmagnetic material such as brass.

End plate 33 acts as support for aforementioned guide pipe 9, which is fixed to its centre.

The means for fixing guide pipe 9 to end plate 33 and this latter to stator pole 31 have not been shown in order to avoid overloading the drawing unnecessarily and because they may be of a varied nature and are well known to persons skilled of the art.

Stator part 13 also includes a connecting part 34 having, in this example, the general shape of a T, whose vertical bar is connected to stator pole 31. The ends of the horizontal bar of connecting portion 34, which will be discussed hereinafter, are designated by the references 35 and 36.

Stator parts 11 to 13, and in particular stator poles 15, 16, 22 and 31, are obviously arranged so that rotors 2 and 3 can rotate freely.

Thus, there exist spaces or airgaps, 41 and 42 between magnet 4 of rotor 2, and teeth 19 of stator pole 15 and teeth 20 of stator pole 16 respectively. Likewise, there exist airgaps 43 and 44 between magnet 5 of rotor 3, and teeth 26 of stator pole 22 and teeth 27 of stator pole 23 respectively.

Moreover, airgaps 45 and 46 exist between magnet 4 and stator pole 31, situated respectively facing airgaps 41 and 42. Finally, airgaps 47 and 48 exist between magnet 5 and stator pole 31, situated respectively facing airgaps 43 and 44.

Motor 1 also includes three coils 51, 52 and 53 each having a core 54, 55 and 56 respectively.

These coils 51 to 53 will not be described here in detail since they are similar to well known coils which are used in conventional stepping motors currently used in electronic timepieces.

The ends of core 54 of coil 51 are respectively connected, mechanically and magnetically, to stator pole 15 of stator part 11 and to end 35 of connecting portion 34 of stator pole 13.

The ends of core 55 of coil 52 are respectively connected, mechanically and magnetically, to stator pole 15 of stator part 11 and to end 35 of connecting portion 34 of stator pole 13.

The ends of core 56 of coil 53 are respectively connected, mechanically and magnetically, to stator pole 16 of stator part 11 and to end 36 of connecting portion 34 of stator pole 13.

Motor 1 also includes a spacer or strut 61 made of a material having high magnetic permeability such as one of the well known materials currently used to make stepping motor stators.

The ends of strut 61 are respectively connected, mechanically and magnetically, to stator pole 16 of stator part 11 and to stator pole 23 of stator part 12. This stator pole 23 is thus also magnetically connected to coil 53.

The mechanical and magnetic means for connecting cores 54 to 56 and strut 61 to stator parts 11 to 13 may be of various natures and are well known to persons skilled in the art. These means have not been shown in order to avoid overloading the drawing unnecessarily.

Figure 9:
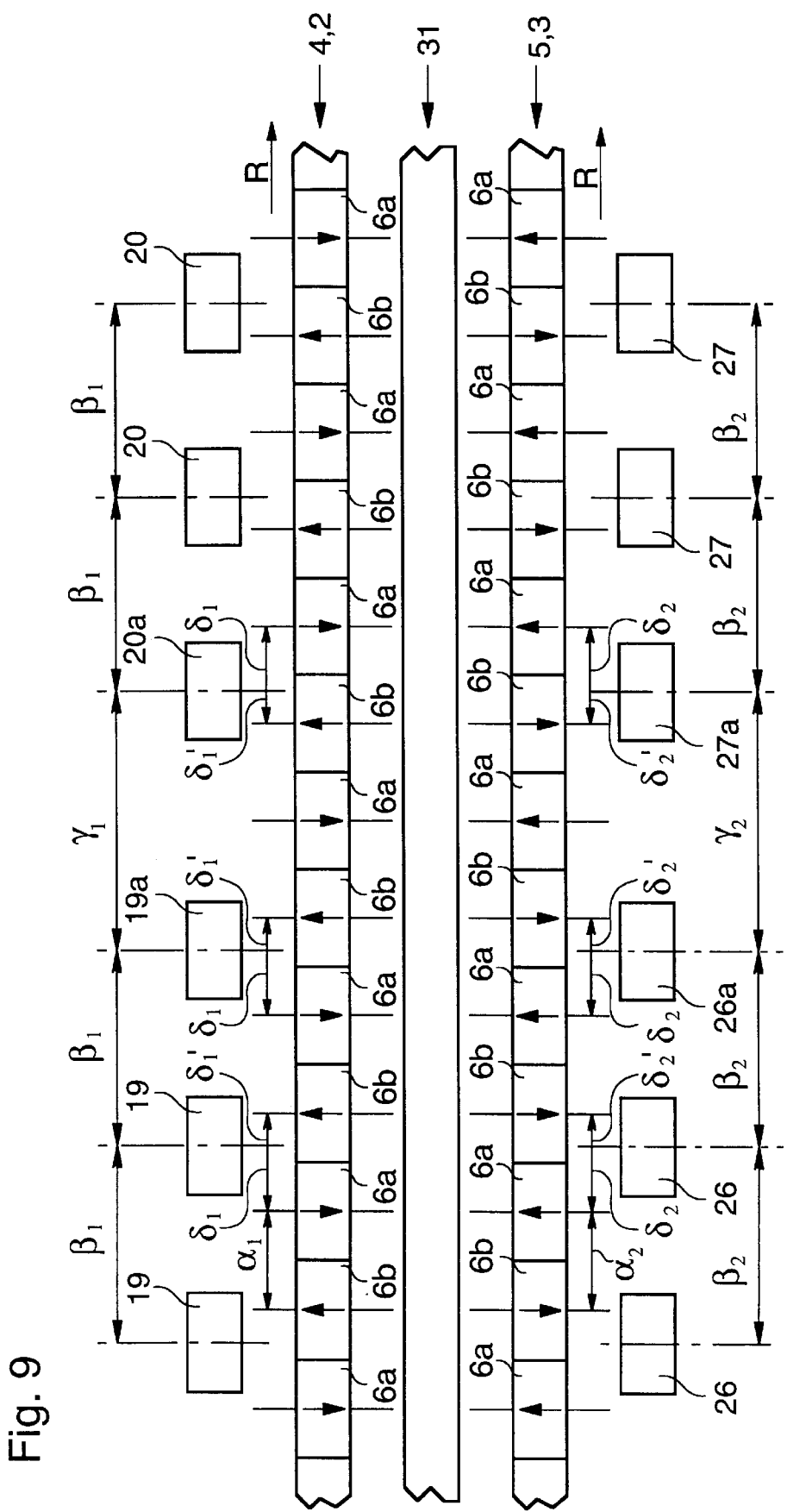
FIGS. 9 to 14 are schematic cross-sections of the motor of FIG. 1 which are intended to assist comprehension of the operation of such motor.
Figure 10:
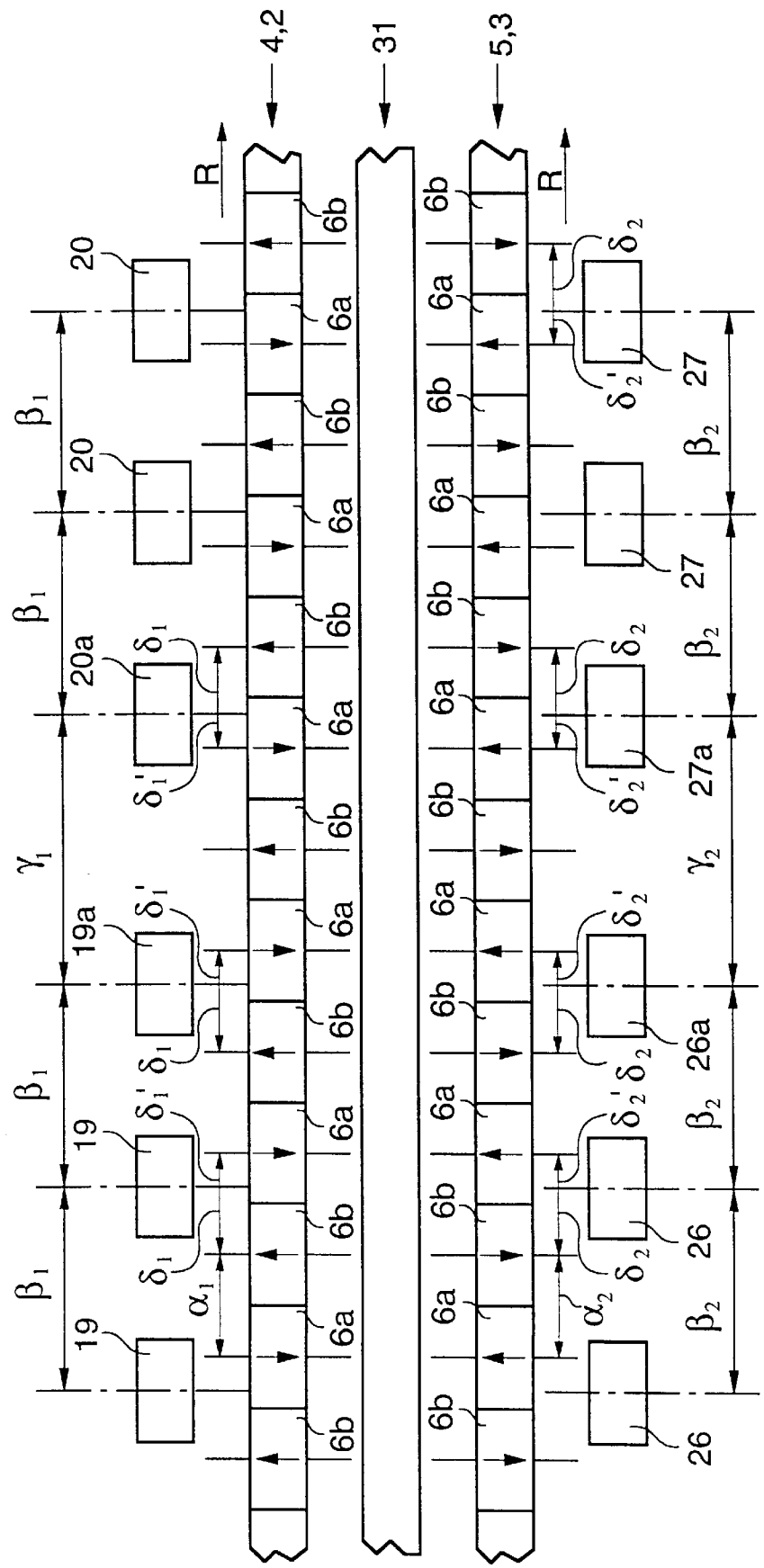

FIGS. 9 and 10 show schematically teeth 19, 20, 26 and 27, magnets 4 and 5 and stator pole 31 of motor 1 as if these elements had been cut by a circular cylinder having an identical axis to that of axis of rotation A and as if this cylinder had itself been cut along one of its generating lines and then flattened to form the plane in which FIGS. 9 and 10 are drawn. It will be noted that only the parts of these elements situated in the vicinity of necks 17 and 24 are shown in FIGS. 9 and 10.

It follows from the manner in which FIGS. 9 and 10 have been made that the various aforementioned angles at centre and those which will be defined hereinafter are represented as segments of horizontal straight lines. Moreover, the rotations in the negative trigonometric direction of rotors 2 or 3, and thus of respective magnets 4 or 5, correspond to translations of the representations of these magnets 4 or 5 in the direction of arrows R shown in FIGS. 9 and 10.

The axes of magnetisation of magnetic dipoles 6 of magnets 4 and 5 have been symbolised in FIGS. 9 and 10 by arrows pointed in the usual manner from their south pole towards their north pole.

In order to simplify the description which follows, all the magnetic dipoles 6 whose axis of magnetisation is directed towards stator pole 31 will be designated 6a, and all the magnetic dipoles 6 whose axis of magnetisation has the opposite direction will be designated 6b.

The presence of teeth 19 and 20 and the spaces which separate them facing magnet 4 causes a positioning torque to be applied to rotor 2 which tends to maintain it in or to bring it back to one or other of a plurality of determined angular positions which will be called rest positions of rotor 2. Likewise, the presence of teeth 26 and 27 and the spaces which separate them facing magnet 5 causes a positioning torque to be applied to rotor 3 which tends to maintain it in or bring it back to one or other of a plurality of determined angular positions which will be called rest positions of rotor 3.

The numbers of rest positions of rotors 2 and 3 are of course respectively equal to number $N_1$ and $N_2$ of magnetic dipoles 6 included in magnets 4 and 5.

The angles which rotors 2 and 3 must travel through to pass from any one of their rest positions to the following one, in one direction or the other, are thus respectively equal to angle $\alpha_1$ and angle $\alpha_2$ defined hereinbefore. The man skilled in the art will easily see that, when they rotate from one of their rest positions to the following one, rotors 2 and 3 each pass through an unstable equilibrium position after having travelled through an angle substantially equal to $\alpha_1/2$ and, respectively, $\alpha_2/2$. The man skilled in the art also knows that, before rotors 2 and 3 have reached this unstable equilibrium position, the positioning torque to which they are subjected tends to return them to their starting position and that, as soon as they have passed this unstable equilibrium position, this positioning torque tends to bring them to their end position.

For obvious reasons of symmetry, one of magnetic dipoles 6a and one of magnetic dipoles 6b, adjacent to the preceding one, are both partially situated facing each of teeth 19, 20, 26 and 27 in each of the rest positions of these rotors 2 and 3.

More specifically, in each rest position of rotor 2, the geometrical axes of the two dipoles 6a and 6b situated facing any one of teeth 19 form with the axis of the latter two angles of respective values $2\alpha_1/3$ and $\alpha_1/3$. These two angles are respectively designated $\delta_1$ and $\delta_1'$ in FIGS. 9 and 10.

It was seen hereinbefore that angles $\beta_1$ formed by the axes of two adjacent teeth 19 are equal to twice angles $\alpha_1$ formed by the geometrical axes of two adjacent magnetic dipoles 6a and 6b. Consequently, in one half of the $N_1$ rest positions of rotor 2, it is always the geometrical axis of a magnetic dipole 6a which forms angle $\delta_1$ defined hereinbefore with the axis of a tooth 19. FIG. 9 shows a case wherein rotor 2 occupies one of these rest positions which will arbitrarily be called first rest positions of this rotor 2.

In the other half of the $N_1$ rest positions of rotor 2, it is obviously always the geometrical axis of a magnetic dipole 6b which forms angle $\delta_1$ with the axis of a tooth 19. FIG. 10 shows a case wherein rotor 2 occupies one of these other rest positions, which will arbitrarily be called second rest positions of this rotor 2.

Magnetic dipoles 6a and 6b also have what may be called angular periodicity. It may thus be said that angle 61 defined hereinbefore is the phase-shift angle of magnetic dipoles 6a and 6b with respect to teeth 19 when rotor 2 is situated respectively in one of its first and one of its second rest positions.

In the present example, in all the rest positions of rotor 2, each magnetic dipole 6a or 6b whose geometrical axis forms angle $\delta_1$ defined hereinbefore with the axis of a tooth 19 is situated behind this tooth 19 with respect to the negative trigonometric direction symbolised by arrow R, since teeth 20 are out of phase by $+2\alpha_1/3$ in the negative trigonometric direction with respect to teeth 19.

It may thus be said that, when rotor 2 is situated in one of its first or one of its second rest positions, phase-shift angle $\delta_1$ of magnetic dipoles 6a or respectively 6b with respect to teeth 19 is equal to $-2\alpha_1/3$ in the negative trigonometric direction.

It was seen hereinbefore that teeth 20 are out of phase with respect to teeth 19 by an angle equal to $\beta_1/3$, or $+2\alpha_1/3$ in the negative trigonometric direction. Consequently, in each of the rest positions of rotor 2, one magnetic dipole 6a and one magnetic dipole 6b adjacent to the preceding one are both partially situated facing one of teeth 20. Moreover, the geometrical axes of these two dipoles 6a and 6b form two angles also of values $2\alpha_1/3$ and $\alpha_1/3$ with the axis of this tooth 20. These angles are also respectively designated by the references $\delta_1$ and $\delta_1'$ in FIGS. 9 and 10.

Furthermore, in all the first rest positions of rotor 2, it is also the geometrical axis of a dipole 6a which forms angle $\delta_1$ with the axis of a tooth 20. Consequently, it is also the geometrical axis of a dipole 6b which forms angle $\delta_1$ with the axis of a tooth 20 in all the second rest positions of rotor 2.

Conversely, the phase-shift or phase difference of teeth 20 with respect to teeth 19 defined hereinbefore has the effect that, in all the rest positions of rotor 2, each magnetic dipole 6a or 6b whose geometrical axis forms angle $\delta_1$ defined hereinbefore with the axis of a tooth 20 is situated in front of the latter with respect to the negative trigonometric direction. In other words, it may thus be said that when rotor 2 is in one of its first rest positions or one of its second rest positions, phase-shift angle $\delta_1$ of magnetic dipoles 6a or, respectively 6b, with respect to teeth 20 is equal to $+2\alpha_1/3$ in the negative trigonometric direction.

In summary, it is seen in the present example where teeth 20 are phase-shifted, in the negative trigonometric direction, by an angle equal to $+2\alpha_1/3$ with respect to teeth 19, magnetic dipoles 6a and, respectively 6b, of magnet 4 are phase-shifted, in the negative trigonometric direction, by an angle equal to $-2\alpha_1/3$ with respect to teeth 19 and by an angle equal to $+2\alpha_1/3$ with respect to teeth 20, when rotor 2 occupies its first and, respectively, second rest positions.

Considerations similar to those which have been made hereinbefore with respect to rotor 2 show that rotor 3 also has first and second rest positions in which the axis of each of teeth 26 and 27 forms with the geometrical axis of a magnetic dipole 6a or, respectively, 6b, a phase-shift $\delta_2$ equal to $2\alpha_2/3$.

Moreover, in the present example where teeth 27 are phase-shifted, in the negative trigonometric direction, by an angle equal to $+\alpha_2/3$ with respect to teeth 26, magnetic dipoles 6a and, respectively, 6b, of magnet 5 are phase-shifted, in the negative trigonometric direction, by an angle equal to $-2\alpha_2/3$ with respect to teeth 26 and by an angle equal to $+2\alpha_2/3$ with respect to teeth 27 in the first and second rest positions of rotor 3.

FIGS. 9 and 10 also illustrate two cases in which rotor 3 occupies respectively one of its first and one of its second rest positions.

When an electric current passes through coil 51, the magnetic flux which it generates in core 54, which will be designated F1, closes on itself following a path which includes successively stator pole 15, teeth 19 of the latter, airgap 41, magnet 4 of rotor 2, airgap 45, stator pole 31 and connecting portion 34.

Likewise, when an electric current passes through coil 52, the magnetic flux which it generates in core 55, which will be designated F2, closes on itself following a path which includes successively stator pole 22, teeth 26 of the latter, airgap 43, magnet 5 of rotor 3, airgap 47, stator pole 31 and connecting portion 34.

Moreover, when an electric current passes through coil 53, the magnetic flux which it generates in core 56, which will be designated F3, closes on itself following two parallel paths both passing via stator pole 16. From this stator pole 16, one of the paths passes successively through teeth 20, airgap 42, magnet 4 of rotor 2, airgap 46, stator pole 31 and connecting portion 34. The other path, starting from stator pole 16, passes successively through airgap 61, stator pole 23, teeth 27 of the latter, airgap 44, magnet 5 of rotor 3, airgap 48, stator pole 31 and connecting portion 34.

The portions of magnetic flux F3 passing through these two paths will be called respectively magnetic flux F3$a$ and F3$b$.

It should be noted that one part of magnetic flux Fl, F2 or F3 obviously passes through necks 17 and 18 and/or 24 and 25 and closes on itself following all or part of the aforementioned paths. But the magnetic reluctance of these necks 17, 18, 24 and 25 is sufficiently large that these parts of flux F1, F2 or F3 are negligible.

It should also be noted that magnetic flux F1, F2, F3$a$ and F3$b$ all have a substantially parallel direction to axis of rotation A between stator parts 11 and 12 on the one hand and stator part 13 on the other hand. When they pass through magnets 4 or 5, these flux F1, F2, F3$a$ and F3$b$ thus have a parallel direction to that of the axes of magnetisation of magnetic dipoles 6.

The direction of these flux F1, F2, F3$a$ and F3$b$ obviously depends on the direction of the current passing in coils 51 to 53 which generates them.

It will be admitted arbitrarily that these flux F1, F2, F3$a$ and F3$b$ are positive when they pass through magnets 4 or 5 in a direction going from stator parts 11 and 12, or more precisely from teeth 19, 20, 26 or 27, towards stator part 13, or more precisely towards stator pole 31. These flux F1, F2, F3$a$ and F3$b$ will obviously be called negative in the opposite case.

In FIGS. 11 to 14 which will be described hereinafter, the resultants of these flux F1, F2, F3$a$ and F3$b$ are symbolised by the arrows designated by the same references. It is to be noted that, in order to make FIGS. 11 to 14 clearer, these arrows have been slightly staggered with respect to the axes of teeth 19, 20, 26 or 27. It is however obvious that, in reality, the resultants of these flux F1, F2, F3$a$ and F3$b$ have a direction which is identical to the direction of the axes of teeth 19, 20, 26 or 27.

The control circuit of motor 1 has not been shown and will not be described here since a person skilled in the art will have no difficulty in designing it in light of the explanations which will be given hereinafter.

It will simply be mentioned that this control circuit is arranged so as to apply a driving pulse to coils 51, 52 and/or 53 each time that rotor 2 or rotor 3 has to rotate through one step.

Moreover, this control circuit may be arranged so that, during each driving pulse, the voltage applied to one and/or the other of these coils 51 to 53 is constant, or that it is the current flowing in one and/or the other of these coils 51 to 53 which is constant. The man skilled in the art will easily see that motor 1 operates whatever the type of driving pulses applied to its coils 51, 52 and/or 53. This type of driving pulse will thus not be specified in the following description. Any driving pulse which causes the creation of a positive or, respectively negative magnetic flux F1, F2, F3$a$ and/or F3$b$ through coil 51, 52 and/or 53 to which it is applied will simply be called positive or negative.

The man skilled in the art will also easily see that the duration of the driving pulses may be either fixed or variable. In all cases, this duration is of course determined so that rotor 2 or 3 concerned correctly finishes its step in response to each driving pulse, even if the resistant torque which it has to overcome during such driving pulse has the maximum value for which motor 1 is designed.

The man skilled in the art well knows that, in practice, this duration is preferably determined so that rotor 2 or 3 concerned has at least reached an angular position situated slightly before its unstable equilibrium position defined hereinbefore at the moment when the driving pulse is interrupted. When rotor 2 or 3 has reached this angular position, it finishes it step as a result of its inertia or that of the mechanical elements which it drives and, after it has passed its unstable equilibrium position, as a result of the positioning torque which then tends to bring it to its next rest position.

In order to avoid unnecessarily complicating the following description, it will be admitted that the control circuit of motor 1 is arranged so that the duration of all the driving pulses which it applies to coils 51, 52 and/or 53 is determined as has just been described.

FIGS. 11 to 14 are similar to FIGS. 9 and 10 described hereinbefore. However, in order to avoid unnecessarily overloading FIGS. 11 to 14, only the references used in the explanations which they illustrate have been indicated therein.

Figure 11:
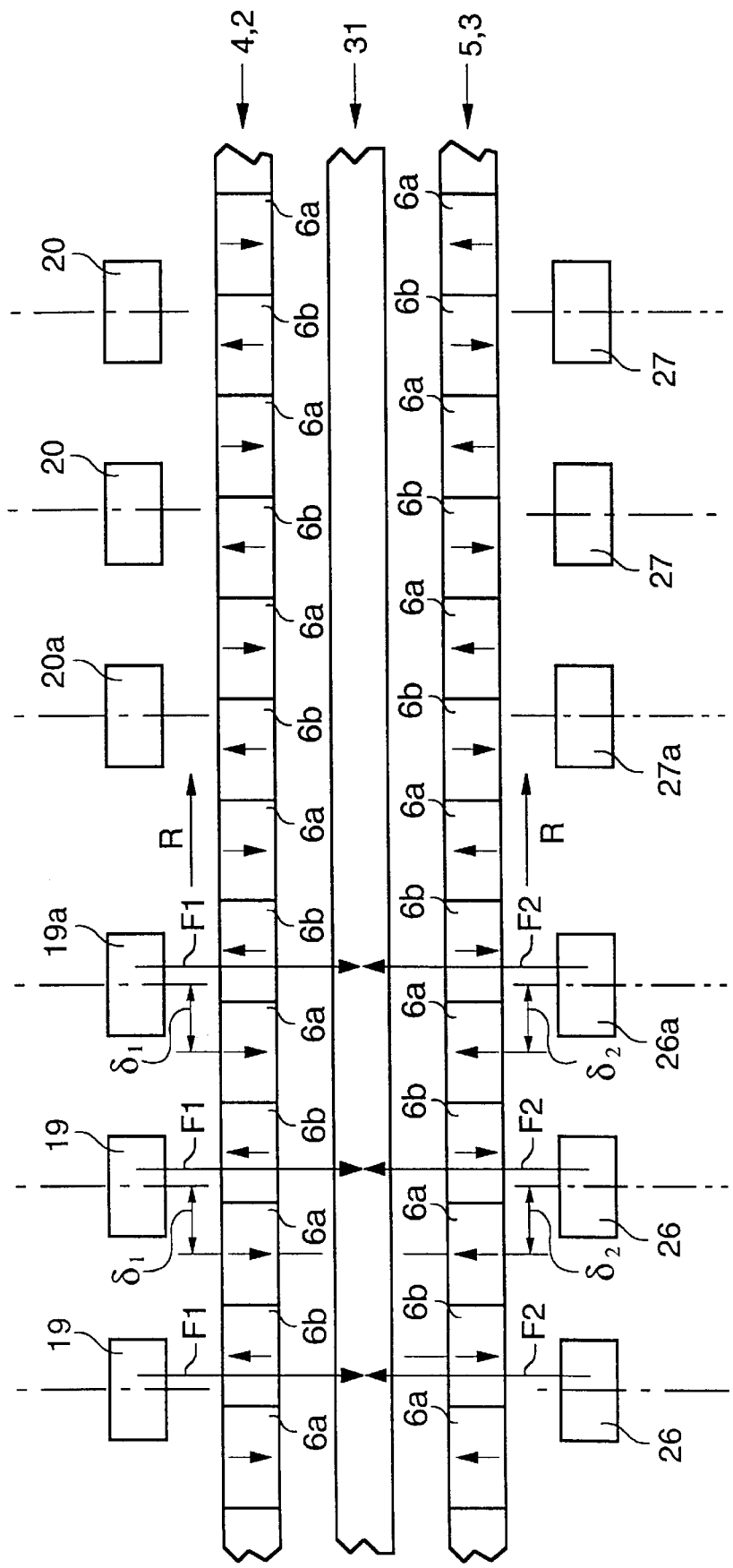

It will be admitted that, at the moment when this description of the operation of motor 1 begins, rotor 2 is in one of its first rest positions. It is thus magnetic dipoles 6$a$ of magnet 4 which are phase-shifted by angle $\delta_1$ with respect to teeth 19, and this phase-shift angle $\delta_1$ is equal to $-\beta_1/3$ in the negative trigonometric direction. FIG. 11 illustrates such a situation.

If the control circuit of motor 1 then applies a positive driving pulse to coil 51, magnetic flux F1 generated by this latter passes through magnet 4 in the direction going from teeth 19 towards stator pole 31, as is shown in FIG. 11. Magnetic flux F1 thus has the same direction in magnet 4 as the axes of magnetisation of magnetic dipoles 6$a$.

The interaction of magnetic flux F1 and the flux generated by magnetic dipoles 6$a$ and 6$b$ situated partially facing teeth 19 generates, in a known manner, a torque which tends to align the axes of magnetisation of these latter magnetic dipoles 6$a$ with this flux F1. This torque, which will be termed driving torque, thus rotates magnet 4 and thus rotor 2, in the negative trigonometric direction symbolised by arrow R.

After the end of this positive driving pulse applied to coil 51, rotor 2 ends its step as has been described hereinbefore and stops in the next of its second rest positions. Rotor 2 then remains in this second rest position until the control circuit of motor 1 applies a new driving pulse to coils 51, 52 and/or 53 in circumstances which will be described hereinafter.

Figure 12:
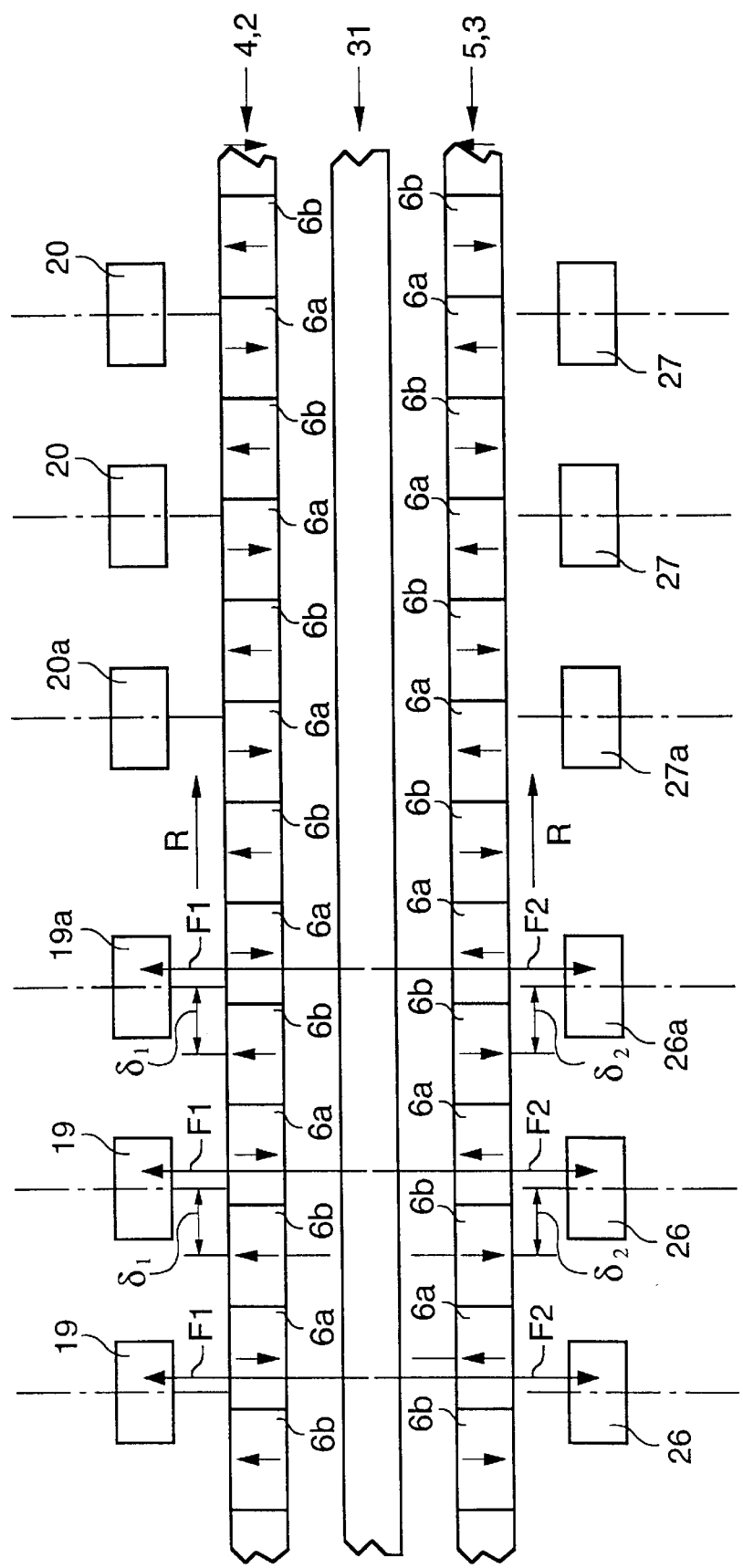

It will be recalled that when rotor 2 is in any one of its second rest positions, magnetic dipoles 6, whose geometrical axis makes angle $\delta_1$ defined hereinbefore with one of teeth 19, are all dipoles 6$b$. FIG. 12 illustrates such a situation.

If the control circuit of motor 1 then applies a negative driving pulse to coil 51, magnetic flux F1 generated by this latter passes through magnet 4 in the direction going from stator pole 31 towards teeth 19 as is shown in FIG. 12.

Magnetic flux F1 thus has the same direction in magnet 4 as the axes of magnetisation of magnetic dipoles 6b situated partially facing teeth 19.

The interaction of magnetic flux F1 and the magnetic flux generated by magnetic dipoles 6a and 6b which are partially facing teeth 19 thus also generates a motor torque which is applied to rotor 2. This driving torque tends to align the axes of magnetisation of magnetic dipoles 6b with flux F1 and thus also rotates rotor 2 in the negative trigonometric direction.

In a similar manner to that which was described hereinbefore, rotor 2 finishes its step after the end of the negative driving pulse applied to coil 51 and reaches its next rest position, which is obviously one of its first rest positions.

In summary, it is seen that rotor 2 rotates by steps in the negative trigonometric direction in response to driving pulses of alternating polarity successively applied to coil 51.

It is also seen that rotor 3 is absolutely not influenced by the driving pulses applied to coil 51 since these driving pulses do not cause the passage of any magnetic flux in magnet 5 of this rotor 3.

FIGS. 11 and 12 also respectively illustrate a case in which rotor 3 is in one of its first rest positions and a case in which rotor 3 is in one of its second rest positions. Flux F2 generated respectively by a positive driving pulse and a negative driving pulse applied to coil 52 are also shown in these FIGS. 11 and 12.

It is easily seen that, for similar reasons to those which were given hereinbefore in the case of rotor 2, rotor 3 also rotates through successive steps in the negative trigonometric direction in response to driving pulses of alternating polarity applied to coil 52 by the control circuit of motor 1. The reasons for such rotation of rotor 3 will not therefore be detailed here.

It will however be noted that rotor 2 is also not influenced by the driving pulses applied to coil 52 since these driving pulses do not cause the passage of any magnetic flux in magnet 4 of rotor 2.

Figure 13:
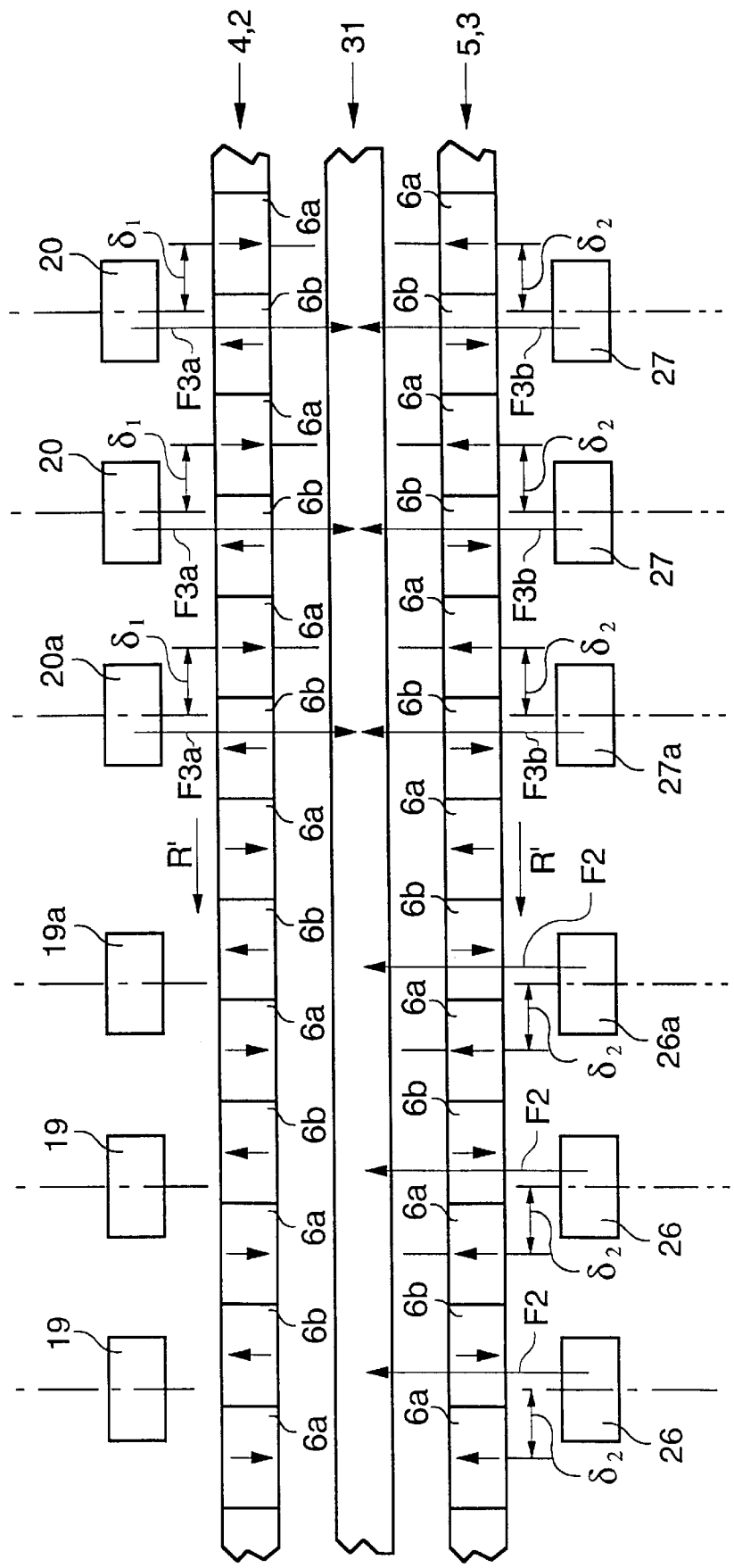

FIG. 13 illustrates a case in which rotors 2 and 3 are both in one of their first rest positions.

Similar considerations to those made hereinbefore, and which will not thus be repeated here, show that if the control circuit for motor 1 then applies a positive driving pulse to coil 53, the two portions F3a and F3b of magnetic flux F3 generated by this coil 53 respectively pass through magnet 4 of rotor 2 and magnet 5 of rotor 3 in the direction of the magnetisation axis of magnetic dipoles 6a of magnets 4 and 5. These magnetic flux F3a and F3b have also been symbolised in FIG. 13. This positive driving pulse applied to coil 53 thus causes torques to be applied to rotors 2 and 3 which tend to rotate the rotors in the positive trigonometric direction, which is symbolised in FIG. 13 by arrow R'.

If no other measure is taken, these two rotors 2 and 3 thus rotate simultaneously in the positive trigonometric direction in response to this positive driving pulse applied to coil 53. After the end of this driving pulse, each of rotors 2 and 3 finishes its step and reaches its next rest position which is of course one of its second rest positions. This situation is illustrated in FIG. 14.

Figure 14:
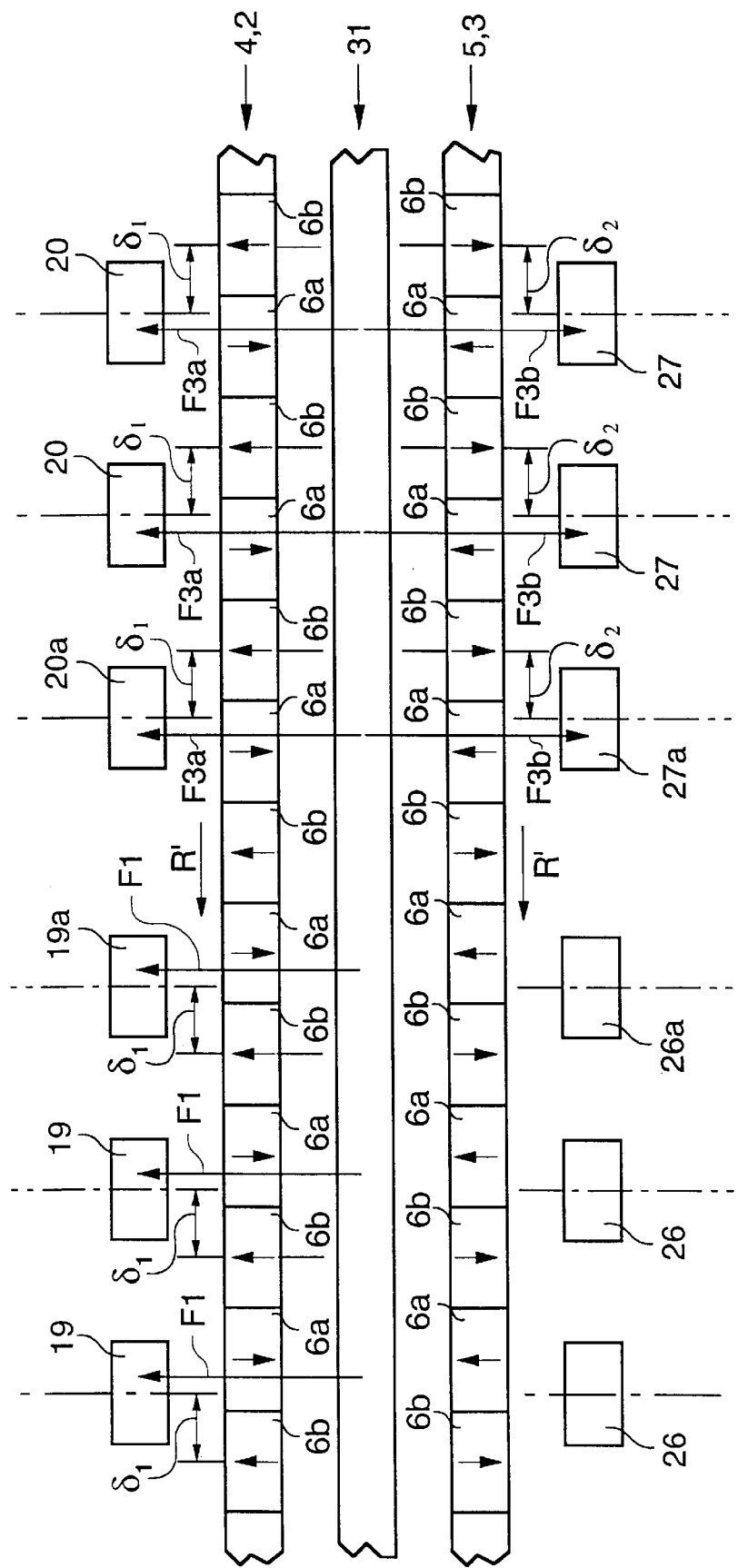

It is easily seen that if the control circuit of motor 1 then applies a negative driving pulse to coil 53, magnetic flux F3a and F3b have, in magnets 4 and 5, the same direction as the magnetisation axes of magnetic dipoles 6b, as has been shown in FIG. 14. The torque which is applied to rotors 2 and 3 thus also tends to rotate them in the positive trigonometric direction symbolised by arrow R'.

Again, if no other measure is taken, rotors 2 and 3 thus rotate simultaneously in the positive trigonometric direction in response to this negative driving pulse applied to coil 53 and, after the end of this driving pulse, finish their step and reach their next rest position, which is of course one of their first rest positions.

It was seen hereinbefore that, when rotor 2 or rotor 3 are in one of their first rest positions, a positive driving pulse causes rotor 2 or rotor 3 to rotate in the negative trigonometric direction if it is respectively applied to coil 51 or coil 52, and in the positive trigonometric direction if it is applied to coil 53.

It is thus possible to avoid rotors 2 and 3 simultaneously rotating in response to a driving pulse applied to coil 53 as has been described hereinbefore, which is not generally desired.

In order to do this, the control circuit of motor 1 is arranged so that, when it applies a driving pulse to coil 53, it simultaneously applies another driving pulse of the same polarity to coil 52 if rotor 2 is to be the only one to rotate, or to coil 51 is rotor 3 is to be the only one to rotate.

FIG. 13 illustrates such a case, in which rotor 2 has to rotate in the positive trigonometric direction in response to a positive driving pulse applied to coil 53. The control circuit of motor 1 thus applies, as the same time as this latter, another driving pulse, which is also positive, to coil 52. Magnetic flux F2 generated by this coil 52 in response to this second driving pulse is also shown in FIG. 13.

The features of motor 1 and its control circuit are determined so that the two torques which are applied to rotor 3 are equal in absolute value. Since these two torques have the opposite directions, they therefore cancel each other out. Rotor 3 thus remains immobile and only rotor 2 rotates through one step in the positive trigonometric direction in response to the positive driving pulse applied to coil 53.

FIG. 14 illustrates a case in which only rotor 3 has to rotate through one step in the positive trigonometric direction from one of its second rest positions in response to a negative driving pulse applied to coil 53.

It is easily seen that, in such a case, the control circuit of motor 1 applies another driving pulse, which is also negative, to coil 51. Magnetic flux F1, also shown in FIG. 14, and F3a then apply two torques of equal absolute value but of opposite directions, to rotor 2, so that rotor 2 is blocked and only rotor 3 rotates through one step in response to the negative driving pulse applied to coil 53.

The operation of motor 1 in all the other cases which might occur will not be described here since it can easily be deduced from the explanations given hereinbefore.

In the first embodiment of the motor according to the present invention described hereinbefore, the phase-shift angle of teeth 20 with respect to teeth 19 and the phase-shift angle of teeth 27 with respect to teeth 26 are respectively equal to $+2\alpha_1/3$ and $+2\alpha_2/3$ in the negative trigonometric direction.

In a second embodiment of the motor according to the present invention, which has not been shown, these two phase-shift angles are respectively equal to $-2\alpha_1/3$ and $-2\alpha_2/3$, again in the negative trigonometric direction.

The man skilled in the art will easily see that, in this second embodiment, magnetic dipoles 6a and, respectively, 6b of magnet 4 are phase-shifted in the negative trigonometric direction by an angle equal to $+2\alpha_1/3$ with respect to teeth 19 and, consequently, by an angle equal to $-2\alpha_1/3$ with respect to teeth 20 when rotor 2 occupies one of its first and, respectively, second rest positions.

Likewise, in the first and second rest positions of rotor 3, magnetic dipoles 6a and, respectively 6b of magnet 5 are phase-shifted in the negative trigonometric direction by an angle equal to $+2\alpha_2/3$ with respect to teeth 26 and, consequently, by an angle equal to $-2\alpha_2/3$ with respect to teeth 27.

The man skilled in the art will also easily see that, in this second embodiment, driving pulses of alternating polarity applied to coil 51 to coil 52 respectively cause rotor 2 or rotor 3 to rotate in the positive trigonometric direction, whereas such driving pulses cause rotor 2 and rotor 3 to rotate in the negative trigonometric direction when they are applied to coil 53. Moreover, said rotor 2 and said rotor 3 rotate, alone, in said negative trigonometric direction if driving pulses are applied to coil 52, and respectively, 51 at the same time and with the same polarity as those which are applied to coil 53.

It is obvious that the two embodiments which have been described hereinbefore may be combined, the teeth forming part of one of stator parts 11 and 12 and the teeth forming part of the other of such stator parts 11 and 12 being respectively arranged as in the first and second embodiment described hereinbefore.

In the second embodiment described hereinbefore, teeth 20 are phase-shifted with respect to teeth 19 by an angle equal to $-2\alpha_1/3$ in the negative trigonometric direction. It is obvious that this fact may also be expressed by saying that teeth 19 are phase-shifted with respect to teeth 20 by an angle equal to $+2\alpha_1/3$, also in the negative trigonometric direction.

It is thus seen that, in the two embodiments described hereinbefore, there is always a first of the two pluralities of teeth of stator part 11 which is phase-shifted with respect to the second of these two pluralities of teeth by an angle equal to $+2\alpha_1/3$ in the negative trigonometric direction. In the first embodiment described hereinbefore, this first and this second plurality of teeth are respectively constituted by teeth 20 and teeth 19, whereas in the second embodiment described hereinbefore, these two pluralities are respectively constituted by teeth 19 and teeth 20.

It is also seen that, with this same terminology, in both embodiments described hereinbefore, magnetic dipoles 6a and, respectively, 6b of magnet 4 are phase-shifted in the negative trigonometric direction by an angle equal to $+2\alpha_1/3$ with respect to the teeth of the first plurality of teeth and by an angle of $-2\alpha_1/3$ with respect to the teeth of the second plurality of teeth in the first and second rest positions of rotor 2.

Similar considerations may be made as regards teeth 26 and 27 of stator part 12 and rotor 3 which is associated thereto. Thus, it is seen that, in both embodiments described hereinbefore, a first of the two pluralities of teeth of stator part 12, i.e. teeth 27 and, respectively, teeth 26 is phase-shifted with respect to the second of these two pluralities of teeth, i.e. teeth 26 and teeth 27 respectively, by an angle equal to $+2\alpha_1/3$ in the negative trigonometric direction. Likewise, in the two embodiments described hereinbefore, magnetic dipoles 6a and 6b respectively, of magnet 5 are phase-shifted in the negative trigonometric direction by an angle of $+2\alpha_2/3$ with respect to the teeth of the first plurality of teeth in stator part 12 and by an angle of $-2\alpha_2/3$ with respect to the teeth of the second plurality of teeth of such stator part 12 in the first and second rest positions of rotor 3.

As was seen hereinbefore, plurality of teeth 19 is only magnetically connected to coil 51, and plurality of teeth 26 is only magnetically connected to coil 52. Conversely, plurality of teeth 20 and plurality of teeth 27 are magnetically connected together to coil 53. On the other hand, magnet 4 of rotor 2 is magnetically coupled to teeth 19 and to teeth 20, whereas magnet 5 of rotor 3 is magnetically coupled to teeth 26 and to teeth 27.

By comparing the operation of the two embodiments of motor 1 described hereinbefore and using the terminology which is also defined hereinbefore, it is seen that, in these two embodiments, each of rotors 2 and 3 rotates in the positive trigonometric direction and in the negative trigonometric direction in response to driving pulses of alternating polarity applied to whichever of coils 51, 52 and 53, is magnetically coupled respectively to the first and second plurality of teeth magnetically coupled to magnet 4 or 5 of this rotor 2 or 3.

If the coil to which these driving pulses are applied is the one which is connected to two pluralities of teeth, which is the case of coil 53 in the examples hereinbefore, and if only one of rotors 2 or 3 has to rotate in response to these driving pulses, other driving pulses must also be applied, in synchronism with the previous ones and with the same polarity as the latter, to whichever of the two other coils 51 or 52, is connected to the plurality of teeth coupled to magnet 4 or 5 of the other of these rotors 2 or 3.

It is clear that numerous other embodiments of the motor according to the present invention may be made without however departing from the scope of this invention. A few of such embodiments will be described succinctly hereinafter, again by way of non limiting examples, without being shown but the components thereof being designated by the same references as in the descriptions which were given hereinbefore.

In one of these embodiments, stator parts 11 and/or 12, and stator part 13, are formed and arranged so that, in a plane view of motor 1, such as that which is shown in FIG. 1, coils 51 and 52 are not superposed but staggered in relation to each other. Such an arrangement allows the use of coils 51 and 52 having a larger diameter than they have in the example illustrated in FIGS. 1 and 2 without the total thickness of motor 1 being too significant.

In another of these embodiments, magnets 4 and 5 of rotors 2 and 3 are identical. It follows that numbers N1 and N2 of magnetic dipoles 6 included in magnets 4 and 5 are equal, as are angles $\alpha_1$ and $\alpha_2$ on the one hand and angles $\beta_1$ and $\beta_2$ on the other hand. Moreover, aforementioned numbers $k_1$ and $k_2$ are also equal, so that angles $\gamma_1$ and $\gamma_2$ are also equal.

Finally, stator parts 11 and 12 are arranged and placed so that the circles which circumscribe openings 14 and 21 have equal diameters and that teeth 19 and teeth 26 are situated facing each other, as are teeth 20 and teeth 27.

Figure 15:
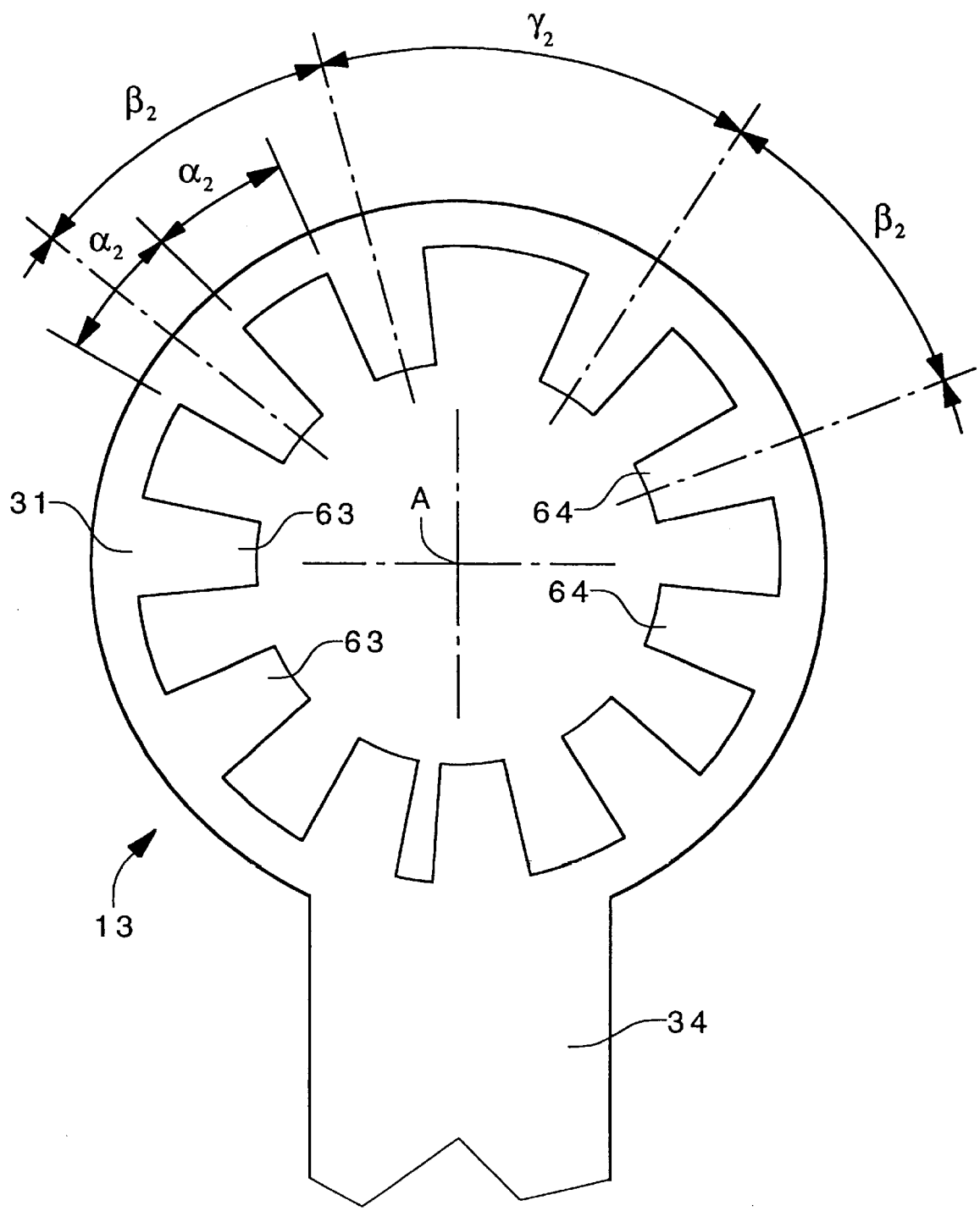
FIG. 15 show yet another embodiment of the motor according to the invention.

In this embodiment, stator part 13, shown in FIG. 15, also has an opening circumscribed by a circle centred on axis of rotation A and having substantially the same diameter as the circle which circumscribes openings 14 and 21 respectively arranged in stator parts 11 and 12. As in stator parts 11 and 12, teeth 63 and 64 extend in a radial direction from the edge of the opening arranged in stator part 13 in the direction of axis of rotation A. Furthermore, each of these teeth is arranged facing one of teeth 19 or 20 of stator part 11, and thus also facing one of teeth 26 or 27 of stator part 12.

These teeth 63 and 64 of stator part 13 are all magnetically coupled via the portion of this stator part 13 which surrounds them and they form a stator pole 31 with this portion. This stator pole 31 of stator part 13 is also magnetically coupled to cores 54 to 56 of coils 51 to 53 via a connecting portion similar to connecting portion 34 described hereinbefore. A stator part 13 formed in this manner allows magnetic flux F1, F2, F3a and F3b to be better directed into airgaps 41 to 48 and thus the efficiency of motor 1 to be increased.

In another embodiment of the motor according to the present invention, the mechanical connection and magnetic coupling between stator poles 16 and 23 and with core 56 of coil 53 is assured as a result of the fact that stator parts 11 and/or 12 are bent so that such stator poles 16 and 23 are in contact with each other in a zone far from opening 14 and teeth 20 and, respectively, from opening 21 and teeth 27. Moreover, these stator poles 16 and 23 are fixed to each other in this same zone, and one of them is also fixed to the end of core 56 of coil 53, again in this same zone.

In an alternative of this embodiment, stator poles 16 and 23 are not directly in contact with each other in the aforementioned zone but are each in contact, with one of the faces of the end of core 56, which is thus gripped between them.

Figure 3:
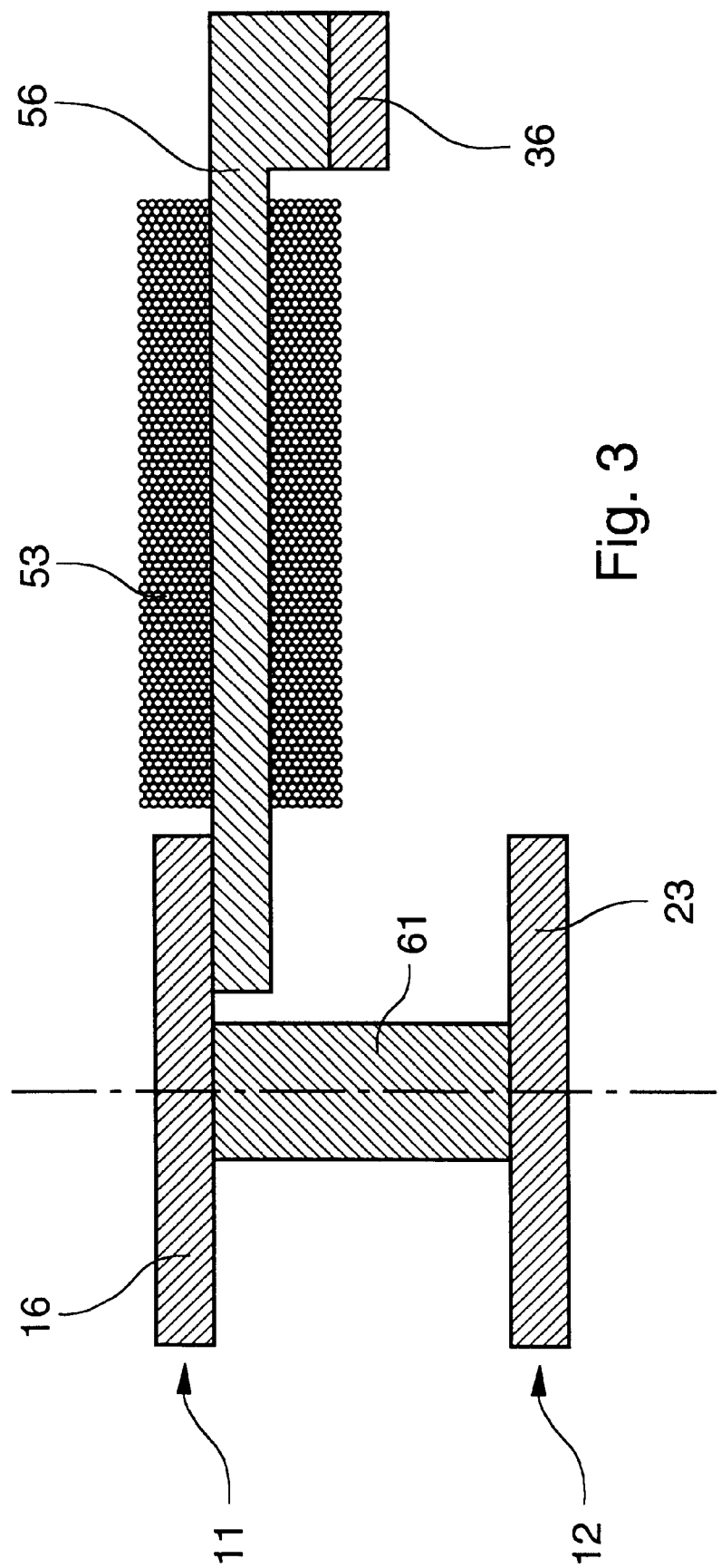
Figure 4:
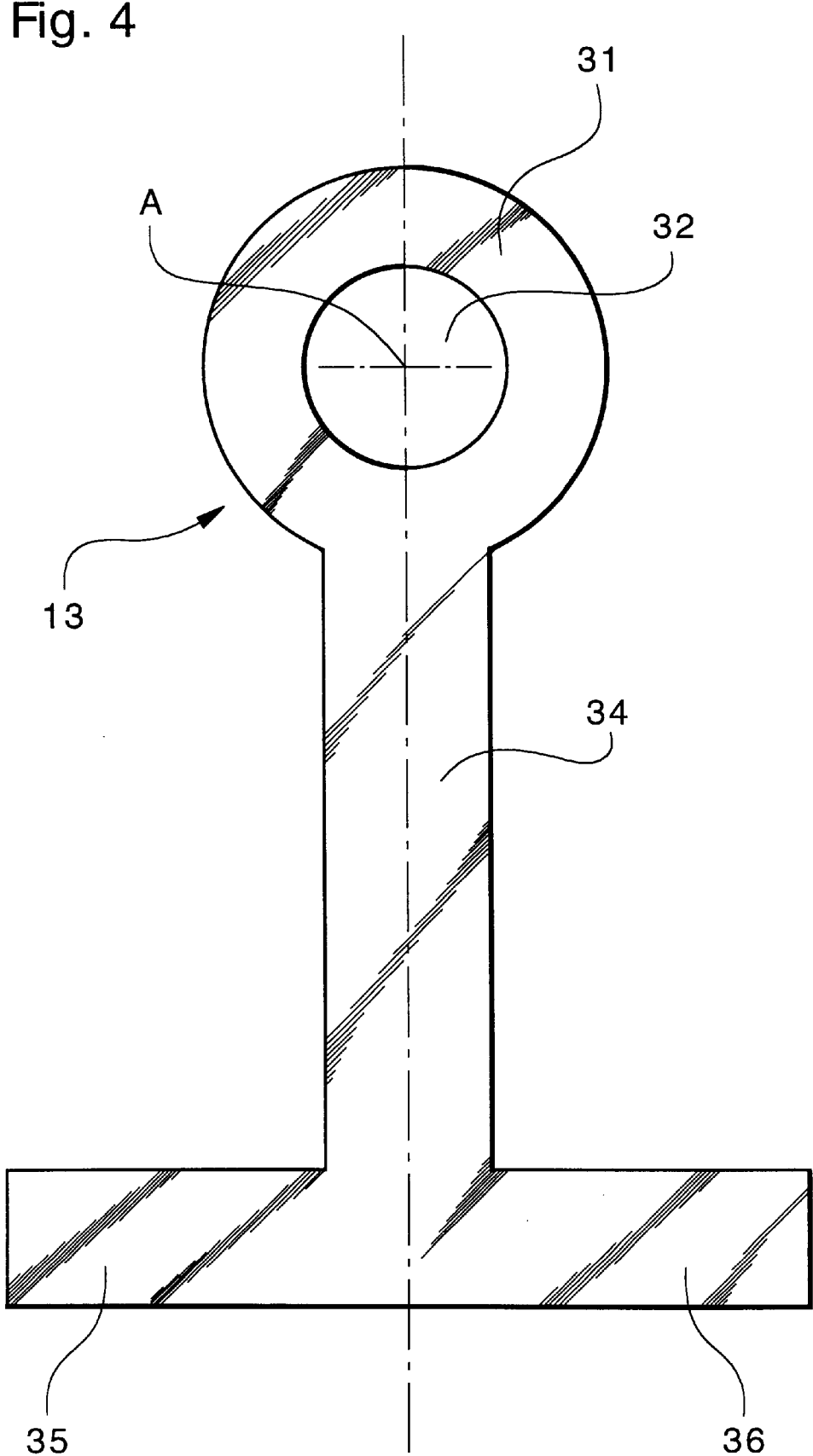
FIG. 4 shows one of the components of the motor of FIG. 1.

In this latter embodiment, strut 61, which assures the mechanical connection and magnetic coupling of stator poles 16 and 23 in the example illustrated in particular in FIGS. 1 and 3, therefore does not exist.

In the embodiments described hereinbefore, the angles at centre formed by the flanks of each of teeth 19 and by the flanks of each of teeth 20 are equal to each other, and to the angles at centre formed by the flanks of two adjacent teeth 19 and by the flanks of two adjacent teeth 20. All these angles at centre are equal to angle $\alpha_1$, and thus to half of angle $\beta_1$ In other words, if the angles at centre formed respectively by the flanks of each of teeth 19 and by the flanks of each of teeth 20 are designated dl and $d_2, d_1 = d_2 = \alpha_1 = 0.5\ \beta_1$.

The man skilled in the art will easily understand that the positioning torque applied to rotor 2 results in fact from the algebraic addition of two antagonistic torques due respectively to the presence of teeth 19 and the presence of teeth 20. Moreover, the man skilled in the art will easily see that the amplitude of each of these two torques depends in particular on the ratio between angles $d_1$ and, respectively, $d_2$ which have just been defined and angle $\beta_1$.

It follows that if equal values are selected for angles $d_1$ and $d_2$, the rest positions of rotor 2 are always those which have been described in the examples hereinbefore, i.e. the phase-shift angles of magnetic dipoles 6 with respect to teeth 19 and with respect to teeth 20 are always both equal, in absolute value, to $2\alpha_1/3$. In such a case, conversely, the amplitude of the positioning torque applied to rotor 2 decreases or increases according to whether angles $d_1$ and $d_2$ are greater or less than $0.5\beta_1$. In practice, values of between $0.3\beta_1$ and $0.7\beta_1$ will preferably be selected for angles dl and $d_2$. It also follows that if different values are selected for angles $d_1$ and $d_2$, the phase-shift angles of magnetic dipoles 6 with respect to teeth 19 and with respect to teeth 20 become different from each other. Thus, if angle $d_1$ is greater than angle $d_2$, for example, the amplitude of the torque due to the presence of teeth 19 is greater than that of the torque due to the presence of teeth 20. It follows that, in this case, the phase-shift angle of dipoles 6 with respect to teeth 19 is smaller, in absolute value, than the phase-shift angle of these dipoles 6 with respect to teeth 20, in all the rest positions of rotor 2.

This latter relationship is of course reversed if angle $d_1$ is smaller than angle $d_2$.

In practice, the value of one of the phase-shift angles of magnetic dipoles 6 with respect to teeth 19 or, respectively, 20, may be selected between $\alpha_1/2$ and $2.5\alpha_1/2$. The values of the other of these phase-shift angles is then determined by the fact that the sum of these two angles is obviously always equal to $4\alpha_1/3$.

It is unfortunately not possible to establish a simple relationship allowing the values that angles $d_1$ and $d_2$ must have for the phase-shift angles which have just been mentioned to have the selected values to be determined.

In practice, these values of angles $d_1$ and $d_2$ are determined by experimentation and/or by simulations made with the aid of a computer.

The considerations which have just been made with regard to rotor 2 and teeth 19 and 20 may obviously also be made with regard to rotor 3 and teeth 26 and 27. These considerations will not be repeated.

It will simply be mentioned that the amplitude of the positioning torque applied to rotor 3 may be changed by giving angles at centre $d_3$ and $d_4$ formed respectively by the flanks of teeth 26 and 27, different values to $0.5\beta_2$, these values being preferably between $0.3\beta_2$ and $0.7\beta_2$. Moreover, the values of these angles $d_3$ and $d_4$ may be determined, by experimentation and/or simulations made with the aid of a computer, so that one of the phase-shift angle of magnetic dipoles 6 of magnet 5 with respect to teeth 26 and, respectively, 27, has a different value to $2\alpha_2/3$, between $\alpha_2/2$ and $2.5\alpha_2/3$, the other of these phase-shift angles then having a value such that the sum of these two phase-shift angles is equal to $4\alpha_2/3$.

What is claimed is:

1. An electromagnetic motor including.
    a first rotor and a second rotor able to rotate independently of each other about a common rotation axis and comprising a first and a second permanent magnet respectively, said first and a second permanent magnet having respectively a first and a second plurality of magnetic dipoles arranged regularly in a annular manner about said rotation axis, oriented substantially parallel to said rotation axis alternatively in a first direction and in an opposite second direction and each having a radial geometric axis, the geometric axes of two adjacent magnetic dipoles of said first magnet forming a first angle at centre having a value of $\alpha_1 = 360°/N1$, where N1 is the number of magnetic dipoles of said first magnet, and the geometric axes of the two magnetic dipoles adjacent to said second magnet forming a second angle at centre having a value of $\alpha_2 = 360°/N2$, where N2 is the number of magnetic dipoles of said second magnet
    a first stator part including a first and a second stator pole separated by a first stator opening and respectively including a first plurality of teeth and a second plurality of teeth, the teeth of said first and second plurality of teeth extending radially, facing said first magnet, from the edge of said stator opening towards said rotation axis and each having a radial axis and two flanks, the axes of two teeth adjacent to said first plurality of teeth and the axes of two teeth adjacent to said second plurality of teeth forming third angles at centre having a value $\beta_1 = 2\alpha_1$, and the teeth of one of said first and second plurality of teeth being phase-shifted with respect to teeth of the other of said first and second plurality of teeth by an phase-shift angle having a value equal to $+2\alpha_1/3$ in the negative trigonometric direction;
    a second stator part including a third and a fourth stator pole separated by a second stator opening and respectively including a third plurality of teeth and a fourth plurality of teeth, the teeth of said third and fourth plurality of teeth extending radially, facing said second magnet, from the edge of said second stator opening towards said rotation axis and each having a radial axis and two flanks, the axes of two teeth adjacent to said third plurality of teeth and the axes of two teeth adjacent to said fourth plurality of teeth forming fourth angles at centre having a value $\beta_2 = 2\alpha_2$, and the teeth of one of said third and fourth plurality of teeth being phase-shifted with respect to teeth of the other of said third and fourth plurality of teeth by a second phase-shift angle having a value equal to $+2\alpha_2/3$ in the negative trigonometric direction;

a third stator part including a fifth stator pole arranged between said magnets, said magnets being further arranged between said fifth stator pole and respectively said first and said second stator pole, on the one hand, and said third and said fourth stator pole on the other hand;

a first coil including a core having a first and a second end magnetically coupled to said first stator pole and to said fifth stator pole respectively;

a second coil including a core having a first and a second end magnetically coupled to said third stator pole and to said fifth stator pole respectively;

a third coil including a core having a first end magnetically coupled to said second and fourth stator poles and a second end magnetically coupled to said fifth stator pole.

2. An electromagnetic motor according to claim 1, wherein said second and fourth stator poles are magnetically coupled by means of a spacer.

3. An electromagnetic motor according to claim 1, wherein said second and fourth stator poles are in contact with each other in a zone remote from said first and respectively second stator opening.

4. An electromagnetic motor according to claim 1, wherein the number N1 of magnetic dipoles of said first magnet is equal to the number N2 of magnetic dipoles of said second magnet, wherein each of the teeth of said first and second pluralities of teeth is arranged facing one of the teeth of said third and fourth pluralities of teeth and wherein said fifth stator pole includes a fifth plurality of teeth, each arranged facing one of the teeth of said first and second pluralities of teeth.

5. An electromagnetic motor according to claim 1, wherein the angles at centre formed by the flanks of each of the teeth of said first plurality of teeth and the angles at centre formed by the flanks of each of the teeth of said second plurality of teeth have values such that in the absence of any other influence, said first rotor occupies an angular position in which the geometric axes of the magnetic dipoles of said first magnet are phase-shifted with respect to the axes of teeth of one of the first and second pluralities of teeth by a third phase-shift angle having a value comprised between $+\alpha_1/2$ and $+2.5\alpha_1/3$ in the negative trigonometric direction.

6. An electromagnetic motor according to claim 1, wherein the angles at centre formed by the flanks of each of the teeth of said third plurality of teeth and the angles at centre formed by the flanks of each of the teeth of said fourth plurality of teeth have values such that in the absence of any other influence, said second rotor occupies an angular position in which the geometric axes of the magnetic dipoles of said second magnet are phase-shifted with respect to the axes of teeth of one of the third and fourth pluralities of teeth by a third phase-shift angle having a value comprised between $+\alpha_2/2$ and $+2.5\alpha_2/3$ in the negative trigonometric direction.

7. An electromagnetic motor according to claim 5, wherein the third phase-shift angle has a value substantially equal to $+2\alpha_1/3$.

8. An electromagnetic motor according to claim 6, wherein third phase-shift angle has a value substantially equal to $+2\alpha_2/3$.

9. An electromagnetic motor according to claim 5, wherein the angles at centre formed by the flanks of each of the teeth of said first plurality of teeth and the angles at centre formed by the flanks of each of the teeth of said second plurality of teeth have values comprised between $0.3\beta_1$ and $0.7\beta_1$.

10. An electromagnetic motor according to claim 5, wherein the angles at centre formed by the flanks of each of the teeth of said third plurality of teeth and the angles at centre formed by the flanks of each of the teeth of said fourth plurality of teeth have values comprised between $0.3\beta_2$ and $0.7\beta_2$.

* * * * *